US012532926B2

(12) United States Patent
Danforth

(10) Patent No.: US 12,532,926 B2
(45) Date of Patent: *Jan. 27, 2026

(54) FILTERING FACEPIECE RESPIRATORS WITH MASK BAND ATTACHMENT

(71) Applicant: Cynthia B. Danforth, Boston, MA (US)

(72) Inventor: Cynthia B. Danforth, Boston, MA (US)

( * ) Notice: Subject to any disclaimer, the term of this patent is extended or adjusted under 35 U.S.C. 154(b) by 615 days.

This patent is subject to a terminal disclaimer.

(21) Appl. No.: 17/855,987

(22) Filed: Jul. 1, 2022

(65) Prior Publication Data

US 2022/0386716 A1 Dec. 8, 2022

Related U.S. Application Data

(63) Continuation-in-part of application No. 17/530,909, filed on Nov. 19, 2021, now Pat. No. 11,406,143.

(60) Provisional application No. 63/123,712, filed on Dec. 10, 2020.

(51) Int. Cl.
*A41D 13/11* (2006.01)
*A62B 23/02* (2006.01)

(52) U.S. Cl.
CPC ........ *A41D 13/113* (2013.01); *A41D 13/1161* (2013.01); *A62B 23/025* (2013.01)

(58) Field of Classification Search
CPC .. A41D 13/11; A41D 13/1123; A41D 13/113; A41D 13/1138; A41D 13/1161; A62B 23/02; A62B 23/025; A62B 18/02; A62B 18/025; A41G 7/00; A61M 16/06; A61M 2016/0661; A61M 2205/59
See application file for complete search history.

(56) References Cited

U.S. PATENT DOCUMENTS 5,697,105 A 12/1997 White
11,013,940 B1 5/2021 Case
11,064,744 B1 * 7/2021 Palacios ............ A41D 13/1107
(Continued)

FOREIGN PATENT DOCUMENTS

JP 2011045693 A * 3/2011 ............ A62B 18/02
JP 2013184043 9/2013
(Continued)

OTHER PUBLICATIONS

Machine translation of JP-2011045693-A.*
(Continued)

*Primary Examiner* — Joseph D. Boecker
(74) *Attorney, Agent, or Firm* — Barnes & Thornburg LLP

(57) ABSTRACT

A customizable mask system can include a facemask, such as a filtering facepiece respirator, that has a first set of fastening elements integrated into an internal surface of the facemask. The system can also include a customizable mask band adapted to cover at least a portion of an external surface of the facemask. The mask band can have one or more attachment portions positioned on the mask band in locations that correspond to positions of the first set of fastening elements on the facemask and a second set of fastening elements integrated into the attachment portions. The attachment portions of the mask band can wrap around side edges of the external surface of the facemask such that the second set of fastening elements mate with the first set of fastening elements.

20 Claims, 32 Drawing Sheets

(56) References Cited

U.S. PATENT DOCUMENTS

| | | | | |
|---|---|---|---|---|
| 11,406,143 | B2 * | 8/2022 | Danforth | A41D 27/08 |
| 2002/0046754 | A1 | 4/2002 | Baumann | |
| 2005/0015860 | A1 | 1/2005 | Reaux | |
| 2007/0023047 | A1 | 2/2007 | Zalsman | |
| 2010/0218774 | A1 * | 9/2010 | Flaherty | A41D 13/1138 29/428 |
| 2011/0180078 | A1 | 7/2011 | McKinley | |
| 2013/0014316 | A1 | 1/2013 | Castro | |
| 2014/0237695 | A1 * | 8/2014 | Al Malki | A41D 13/1192 2/9 |
| 2015/0034098 | A1 | 2/2015 | Schumacher | |
| 2016/0029716 | A1 | 2/2016 | Duncan | |
| 2020/0353296 | A1 * | 11/2020 | Crenshaw | A62B 23/025 |
| 2021/0345713 | A1 * | 11/2021 | Yates | A41D 15/005 |
| 2021/0368874 | A1 * | 12/2021 | Eldibany | A62B 18/086 |
| 2022/0022571 | A1 | 1/2022 | Araujo | |
| 2022/0047010 | A1 * | 2/2022 | Parker | A41D 13/1107 |
| 2022/0053857 | A1 | 2/2022 | Keene, Jr. | |
| 2022/0061433 | A1 | 3/2022 | Bajovie et al. | |
| 2022/0062670 | A1 | 3/2022 | Maddox | |
| 2022/0184432 | A1 | 6/2022 | Danforth | |

FOREIGN PATENT DOCUMENTS

| | | | | |
|---|---|---|---|---|
| JP | 03227953 | | 9/2020 | |
| KR | 200358199 | | 8/2004 | |
| KR | 20090006183 | U * | 6/2009 | A62B 18/02 |
| KR | 20200118776 | | 10/2020 | |

OTHER PUBLICATIONS 3M.com [online], “3M TM Disposable Respirator 1860, 1860S, N95 Technical Data Sheet,” available on and before Oct. 19, 2020, retrieved from URL <https://multimedia.3m.com/mws/media/15389790/3m-disposable-respirator-1860-1860s-technical-data-sheet.pdf>, 2 pages.

PCT International Search Report and Written Opinion in International Appln. No. PCT/US2021/060062, dated Feb. 28, 2022, 9 pages.

* cited by examiner

200

306

304

308

310

FILTERING FACEPIECE RESPIRATORS WITH MASK BAND ATTACHMENT

CROSS-REFERENCE TO RELATED APPLICATIONS

This application is a continuation-in-part of U.S. application Ser. No. 17/530,909, filed on Nov. 19, 2021 and issued on Aug. 9, 2022 as U.S. Pat. No. 11,406,143, which claims the benefit of U.S. Provisional Application Ser. No. 63/123,712, filed Dec. 10, 2020. The disclosure of the prior application is considered part of (and is incorporated by reference in) the disclosure of this application.

TECHNICAL FIELD

This document relates to facemasks, and more particularly, to filtering facepiece respirators (FFRs).

BACKGROUND

During times such as the COVID pandemic, many people wear facemasks to protect themselves and others from contracting disease or other bacteria that can be in the air we breathe. Essential workers, such as medical workers, caregivers, and teachers wear facemasks because they routinely interact with people who need assistance. Facemasks may not be patient-friendly, and may cause unnecessary maskphobia because patients cannot see the faces of those essential workers. This is concerning with cognitively immature patients (e.g., infants and toddlers) as well as the cognitively impaired patients (e.g., elderly with dementia or Alzheimer's). While cloth facemasks can be customized to include logos, smiley faces, and the like, Filtering Facepiece Respirators (FFRs) are subject to various regulatory standards and cannot be printed upon. These standards specify certain physical properties and performance characteristics for FFRs to be compliant. Example FFRs include N95, FFP2, KN95, and surgical masks, which meet the regulatory standards but may not be customized like cloth facemasks.

SUMMARY

This document generally relates to facemasks, and more particularly, to filtering facepiece respirators (FFRs) that can be required to meet certain regulatory standards. Some embodiments described herein include a fastener system that is integrated into an FFR when the FFR is manufactured. The fastening system can allow a mask band or skin to be affixed to the FFR (e.g., on a front of the FFR and/or on an inside of the FFR). The mask band can be customized and can, for example, include an image of an FFR wearer's lower face. As a result, the FFR wearer can have a more personal connection with patients or other people.

Particular embodiments described herein include a customizable mask system having a facemask adapted to be worn on a face of a user. The facemask can include an external surface, an internal surface opposite the external surface that can be positioned towards the face of the user when the user wears the facemask, and a first set of fastening elements integrated into the internal surface of the facemask. The system can also include a customizable mask band adapted to cover at least a portion of the external surface of the facemask. The customizable mask band can include one or more attachment portions positioned on the mask band in locations that can correspond to positions of the first set of fastening elements on the facemask, and a second set of fastening elements integrated into the attachment portions. The attachment portions of the mask band can wrap around side edges of the external surface of the facemask such that the second set of fastening elements can mate with the first set of fastening elements.

In some implementations, the disclosed embodiments can optionally include one or more of the following features. For example, the first set of fastening elements can be welded with at least one of the external surface and the internal surface when the facemask is manufactured. The first set of fastening elements can also be integrated into the internal surface of the facemask with ultrasonic welding. In some implementations, the facemask can be at least one of a regulatory compliant mask, a filtering facepiece respirator (FFR), a KN95, an N95, and a surgical mask. In some implementations, the first set of fastening elements can be loop fasteners and the second set of fastening elements can be hoop fasteners. The second set of fastening elements can also be magnets. The at least one of the first set and the second set of fastening elements can also be adhesive strips, hook-and-loop fasteners, magnets, or a sticky textured material for mating with a receiving material.

As another example, the facemask further can include a third set of fastening elements on the side edges of the external surface of the facemask. The facemask may also include a fourth set of fastening elements that can be disposed laterally across the external surface of the facemask. The facemask can also include a fifth set of fastening elements that can be disposed a predetermined distance between a midpoint and a lateral edge of the facemask. The system can include a customizable mask attachment having a sixth set of fastening elements that can mate with the fifth set of fastening elements when the customizable mask attachment attaches to the facemask.

In some implementations, the first set and the second set of fastening elements can include two fastening elements each. The customizable mask band can be cloth. The customizable mask band can also be at least one of reusable, washable, and disposable. Moreover, the customizable mask band can be applied to a second facemask. The facemask can also include ear loops integrated into the side edges of the facemask, The attachment portions of the customizable mask band can wrap around the side edges of the external surface of the facemask between connection points of each of the ear loops. In some implementations, the customizable mask band can include an image of the user's lower face. The facemask may also be an FFR.

In some implementations, the facemask can satisfy: (i) fluid resistance requirements of ASTM F1862, (ii) particulate filtration efficiency requirements of ASTM F2100, (iii) airflow resistance requirements with an acceptance criterion of <6 mm $H_2O/cm^2$ for differential pressure testing of ASTM F2100, (iii) flammability performance requirements consistent with the definition of a Class 1 or Class 2 textile in 16 CFR Part 1610, and (iv) a manufacturing materials requirement that includes non-cytotoxic, non-irritating, and nonsensitizing material consistent with at least one of International Standard ISO 10993-1, ISO 10993-5, and ISO 10993-10.

One or more embodiments described herein can also include a customizable mask system that includes a facemask adapted to be worn on a face of a user, the facemask having an external surface, an internal surface opposite the external surface that can be positioned towards the face of the user when the user wears the facemask, and a first fastening element integrated into the external surface of the facemask. The system can also include a customizable mask attachment adapted to cover at least a portion of the external surface of the facemask, the customizable mask attachment including an external surface, an internal surface opposite the external surface of the customizable mask attachment, the internal surface positioned towards the external surface of the facemask when the customizable mask attachment covers at least the portion of the external surface of the facemask, and a second fastening element integrated into the internal surface of the customizable mask attachment. The second fastening element can mate with the first fastening element when the customizable mask attachment is covering at least the portion of the external surface of the facemask.

The disclosed embodiments can include one or more features described herein. For example, the first fastening element can be integrated into the external surface of the facemask at least 1 inch from a midpoint of the external surface of the facemask to a lateral edge of the external surface of the facemask, and the first fastening element can cover no more than 15% of the external surface of the facemask.

Particular embodiments described herein can also include a customizable mask system having a facemask adapted to be worn on a face of a user. The facemask can include an external surface, an internal surface opposite the external surface, the internal surface positioned towards the face of the user when the user wears the facemask, and a first set of fastening elements integrated into the internal surface of the facemask. The customizable mask system can also include a customizable mask band adapted to cover at least a portion of the external surface of the facemask. The customizable mask band can include one or more attachment portions positioned on the mask band in locations that correspond to positions of the first set of fastening elements on the facemask, and a second set of fastening elements integrated into the attachment portions. The attachment portions of the mask band can wrap around side edges of the external surface of the facemask such that the second set of fastening elements can mate with the first set of fastening elements.

In some implementations, the disclosed embodiments can optionally include one or more of the following features. The first set of fastening elements can be welded with at least one of the external surface and the internal surface when the facemask is manufactured. The first set of fastening elements can be integrated into the internal surface of the facemask with ultrasonic welding. The facemask can be at least one of a regulatory compliant mask, a filtering facepiece respirator (FFR), a KN95, an N95, and a surgical mask. The first set of fastening elements can be loop fasteners and the second set of fastening elements can be hoop fasteners. The second set of fastening elements can be magnets. At least one of the first set and the second set of fastening elements can be adhesive strips, hook-and-loop fasteners, magnets, or a sticky textured material for mating with a receiving material. The facemask can also include a third set of fastening elements on the side edges of the external surface of the facemask. The facemask can also include a fourth set of fastening elements disposed laterally across the external surface of the facemask. The first set and the second set of fastening elements can include two fastening elements each. The customizable mask band can be cloth. The customizable mask band can be at least one of reusable, washable, and disposable. The customizable mask band can be applied to a second facemask. A second customizable mask band can be applied to the facemask. The facemask can further include ear loops integrated into the side edges of the facemask. The attachment portions of the customizable mask band can be configured to wrap around the side edges of the external surface of the facemask between connection points of each of the ear loops. The customizable mask band can include an image of the user's lower face. The facemask can be an FFR.

The disclosed facemasks can satisfy fluid resistance requirements (e.g., liquid barrier performance) consistent with FDA-recognized standards, American Society for Testing and Materials (ASTM) F1862, particulate filtration efficiency requirements consistent with ASTM F2100, and airflow resistance (e.g., breathability) requirements with an acceptance criterion of <6 mm $H_2O/cm^2$ for differential pressure (delta P) testing consistent with ASTM F2100. The disclosed facemasks may also satisfy flammability performance requirements consistent with the definition of either a Class 1 or Class 2 textile in 16 CFR Part 1610. Moreover, the materials of manufacture for the disclosed facemasks can be (1) non-cytotoxic, non-irritating, and nonsensitizing consistent with the recommendations in FDA's guidance, "Use of International Standard ISO 10993-1, 'Biological evaluation of medical devices—Part 1: Evaluation and testing within a risk management process'" or (2) conform to the following biocompatibility standards: ISO 10993-1, ISO 10993-5, and/or ISO 10993-10.

The disclosed embodiments described herein may provide one or more of the following advantages. For example, the disclosed embodiments provide for adding customization to masks that typically cannot be customized. FFRs, such as KN95, N95, and surgical masks may not be customized like cloth facemasks because doing so can reduce the FFRs compliance with regulatory standards (e.g., by contaminating the wearer with fumes from paints added to the mask, by creating punctures or holes in the mask that reduce effectiveness of the mask in deflecting and/or filtering bacteria or other air particles). The disclosed embodiments, on the other hand, allow a wearer of the FFR to customize their regulatory compliant FFR because the mask band can be attached directly to the FFR.

As another example, the disclosed embodiments provide for customizing a regulatory-compliant mask, such as FFRs, without comprising on the mask's compliance purpose or integrity. The mask band or skin can be attached or fastened to the FFRs while still permitting the FFRs to deflect bacteria or other particles in the surrounding air. For example, a mask band that wraps around the FFR and fastens to an inside of the FFR may not compromise breathability or efficacy in protecting the mask wearer from surrounding bacteria or air particles. The fabric of the mask band that wraps around the FFR can prevent bacteria or air particles from getting around the FFR on sides of the wearer's face.

As yet another example, the disclosed embodiments provide for reducing or eliminating maskphobia. Essential workers, such as caregivers (e.g., nurses and doctors), typically wear FFRs to protect themselves and their patients. However, patients may be afraid of their caregivers or uncomfortable around them because the FFRs cover their faces. For example, in a pediatric cancer ward, doctors and nurses wearing FFRs may appear scary to child patients. With the disclosed embodiments, these doctors and nurses can affix different mask bands to their FFRs. These mask bands can be adorned with pictures of childhood characters and/or an image of the doctors or nurses faces. As a result, the disclosed embodiments can alleviate fears of the patients because the caregivers, who are still wearing their FFRs, can customize these masks without compromising on their efficacy and compliance with regulatory standards. Therefore, the mask wearers can appear more personable, friendly, and relatable.

In another example, the disclosed embodiments provide for seamless integration of the fastening system at a time that the FFR is manufactured. Because the fastening system can be integrated into the FFR at manufacturing (e.g., using ultrasonic welding, the fastening system can become inherent to the FFR like other conventional FFR components, such as ear loops, that are ultrasonically welded with the FFR), the fastening system can be lightweight and nonobtrusive. The lightweight fastening system can be advantageous because it may prevent the FFR from being heavy or uncomfortable on the wearer's face and/or ears. Integration of the fastening system at manufacturing can also result in the system not being visible to the wearer and/or others that the wearer is facing. This can provide for a more aesthetically pleasing look of the FFR, especially if the wearer does not want to attach the mask band to the FFR. Because of the seamless and nonobtrusive integration, the FFR can remain comfortable to wear. The wearer may not feel the fastening system since the system is incorporated into one or more layers or other components of the FFR, instead of being attached to the FFR after it is put together. Finally, integration at manufacturing can be advantageous to prevent the FFR from perforating. Perforation can comprise the FFR's regulatory compliance as well as comfort to the wearer. Because the fastening system can be integrated into the FFR, additional holes or punctures to the FFR may not be necessary to customize the FFR, as described herein.

In another example, the disclosed embodiments provide for ease of applying the mask band. Because the fastening system can be integrated into the FFR at production, the wearer can attach the mask band and/or different mask bands whenever the wearer desires. Traditionally, the FFR wearer may have to apply after-product adhesive to the mask whenever the wearer wants to attach something to the mask. The wearer may also have to remove such after-product adhesive after every use or attachment of something to the mask. Furthermore, the wearer may have to remember to have sufficient or enough adhesive with them in order to attach the mask band. If the wearer does not have the adhesive with them, then they cannot attach the mask band. And, if the wearer does not have time to appropriately place the after-product adhesive and then attach the mask band, the wearer may be dissuaded from customizing their mask. The disclosed embodiments, on the other hand, provide for the fastening system to always be part of the mask, such that the wearer does not have to worry about attaching and removing the fastening system with every application of the mask band. Moreover, the disclosed embodiments are advantageous because the wearer does not have to spend time applying any adhesive and then attached the mask band. The wearer can more quickly and easily attach the mask band to the integrated fastening system of the mask, which can also make the wearer more inclined to customize their mask appearance.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

This document generally relates to facemasks, and more particularly, to filtering facepiece respirators (FFRs) that can be required to meet certain regulatory standards (e.g., high filtration). For example, the disclosed facemasks can satisfy fluid resistance requirements (e.g., liquid barrier performance) consistent with FDA-recognized standards, American Society for Testing and Materials (ASTM) F1862, particulate filtration efficiency requirements consistent with ASTM F2100, and airflow resistance (e.g., breathability) requirements with an acceptance criterion of <6 mm $H_2O/cm^2$ for differential pressure (delta P) testing consistent with ASTM F2100. The disclosed facemasks may also satisfy flammability performance requirements consistent with the definition of either a Class 1 or Class 2 textile in 16 CFR Part 1610. Moreover, the materials of manufacture for the disclosed facemasks can be (1) non-cytotoxic, non-irritating, and nonsensitizing consistent with the recommendations in FDA's guidance, "Use of International Standard ISO 10993-1, 'Biological evaluation of medical devices—Part 1: Evaluation and testing within a risk management process'" or (2) conform to the following biocompatibility standards: ISO 10993-1, ISO 10993-5, and/or ISO 10993-10.

Some embodiments described herein include a fastener system that is integrated into an FFR when the FFR is manufactured. The fastening system can allow a customizable mask band or skin to be affixed to the FFR (e.g., on a front of the FFR and/or on an inside of the FFR). The customizable mask band can have less filtration and/or minimal filtration relative to the FFR, which has higher filtration. The fastening system can also allow a customizable mask attachment or design to be affixed directly to any location on the front of the FFR that does not obstruct filtration aspects of the FFR.

Figure 1A:
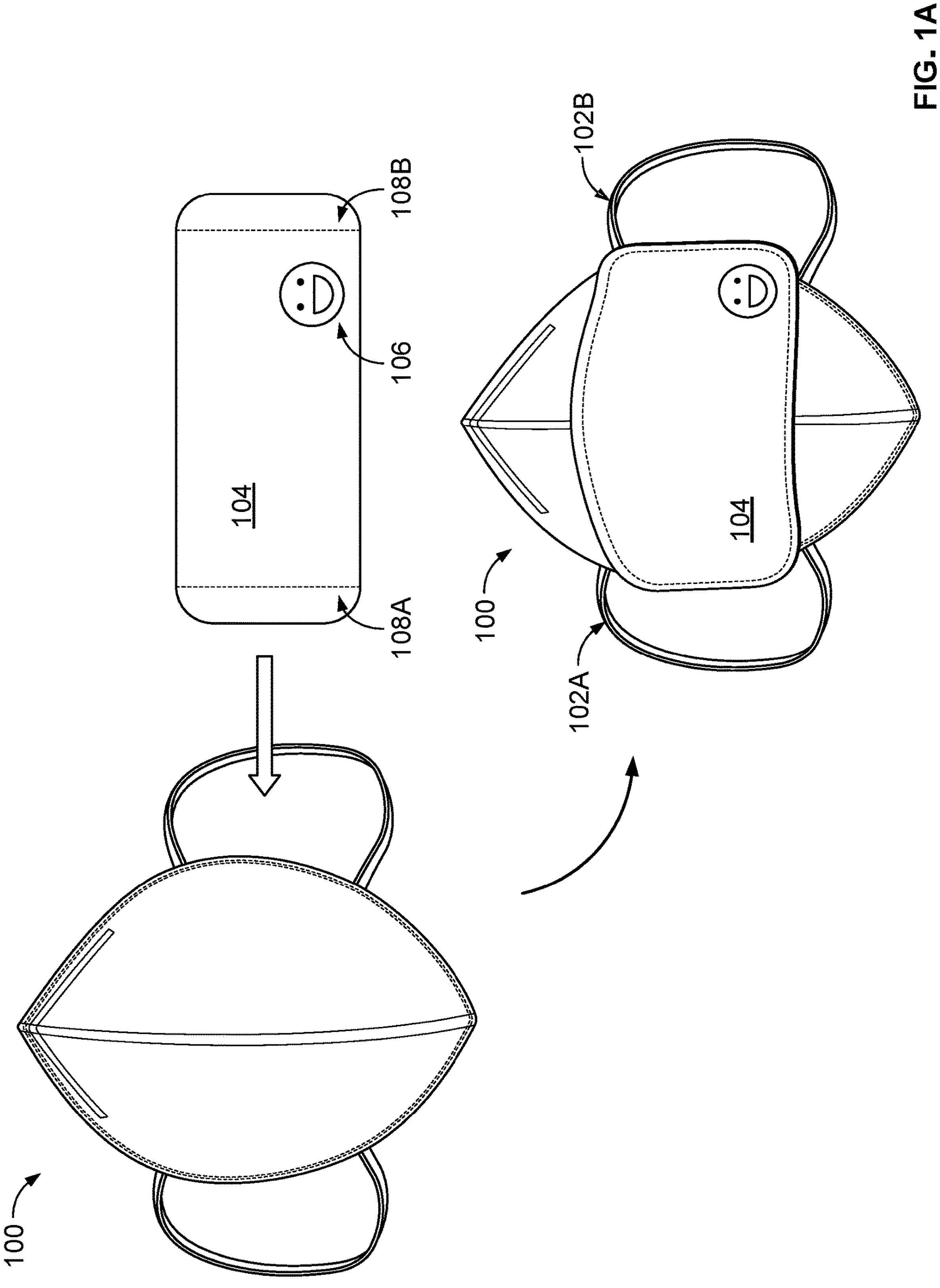
FIGS. 1A-C depict an example FFR with a mask band.
Figure 1B:
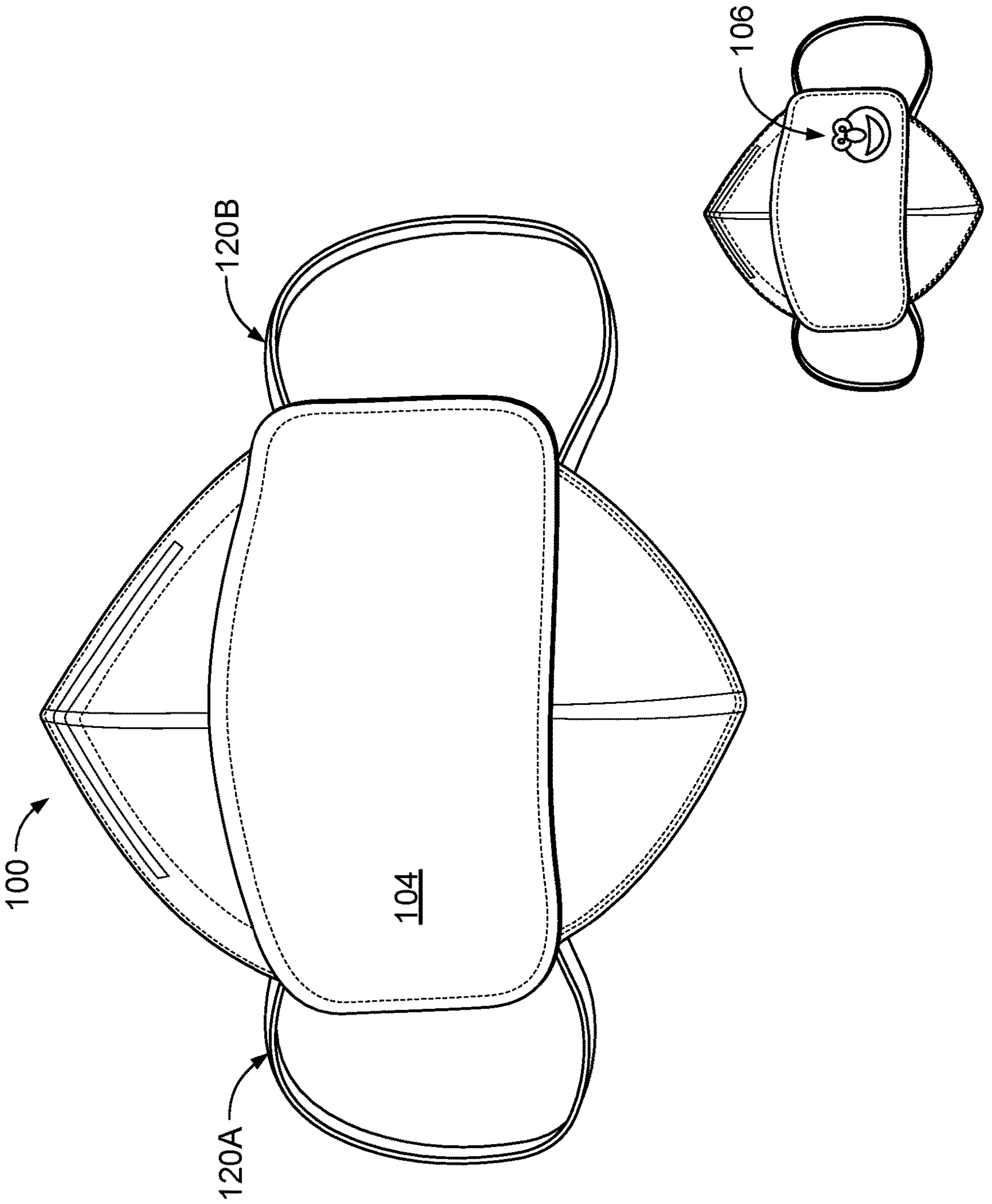
Figure 1C:
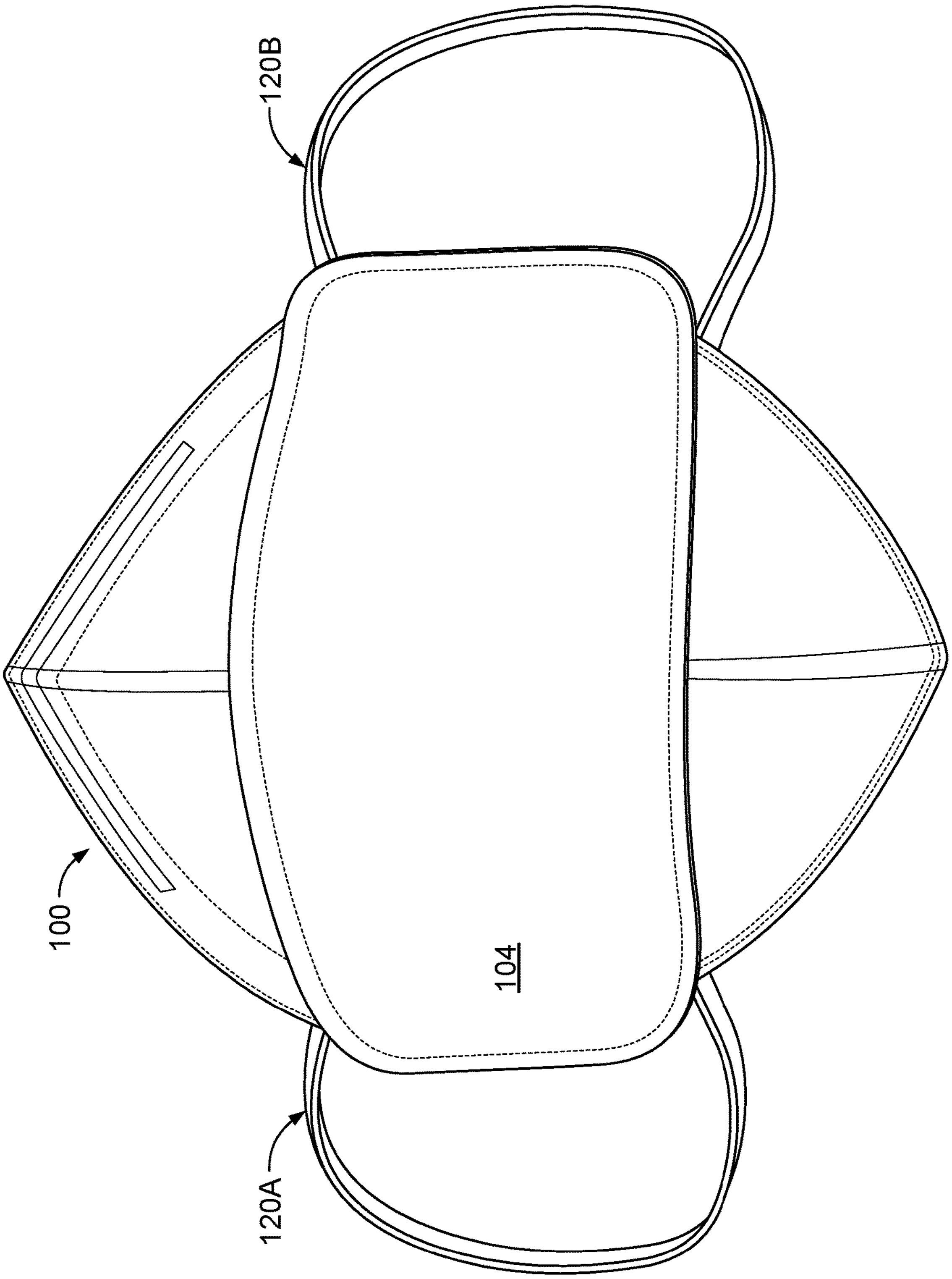

FIGS. 1A-C depict an example FFR 100 (e.g., mask, facemask) with a mask band 104 (e.g., skin). The FFR 100 can be a regulatory compliant mask, such as an N95 and/or KN95 mask. Referring to the FIGS. 1A-C, the FFR 100 can include straps 102A-B so that a user can wear the mask 100 on their face. The mask band 104 can include a design 106. The mask band 104 can include additional flaps 108A-B. The flaps 108A-B can wrap around edges of the FFR 100 and attach or fasten to a fastening system of the FFR 100, as described herein. The mask band 104 can be made from cotton or any other fabric. The mask band 104 can be washed and/or reused. As depicted in FIG. 1A, the mask band 104 can be placed on top of a front of the FFR 100 and the flaps 108A-B can wrap around sides or edges of the FFR 100. Therefore, the mask band 104 can be unobtrusively secured in place on the FFR 100.

Figure 2A:
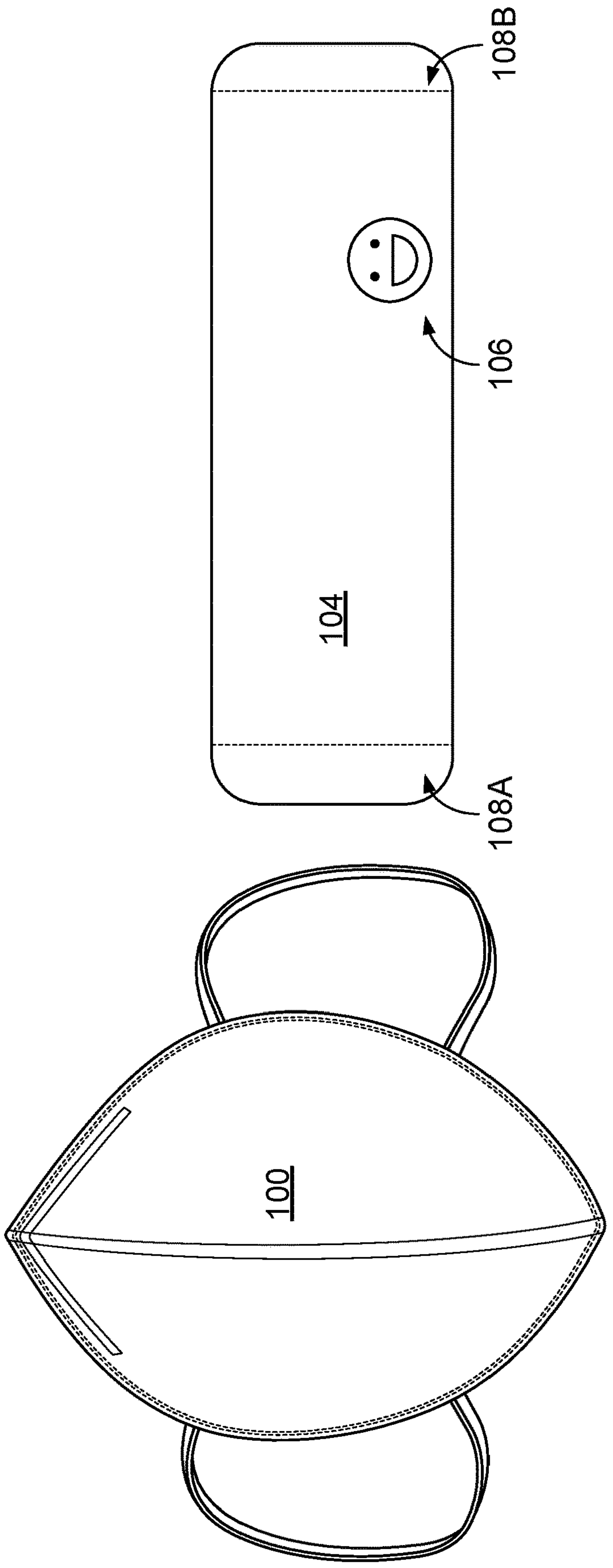
FIGS. 2A-B depict the FFR and the mask band of FIGS. 1A-C.
Figure 2B:
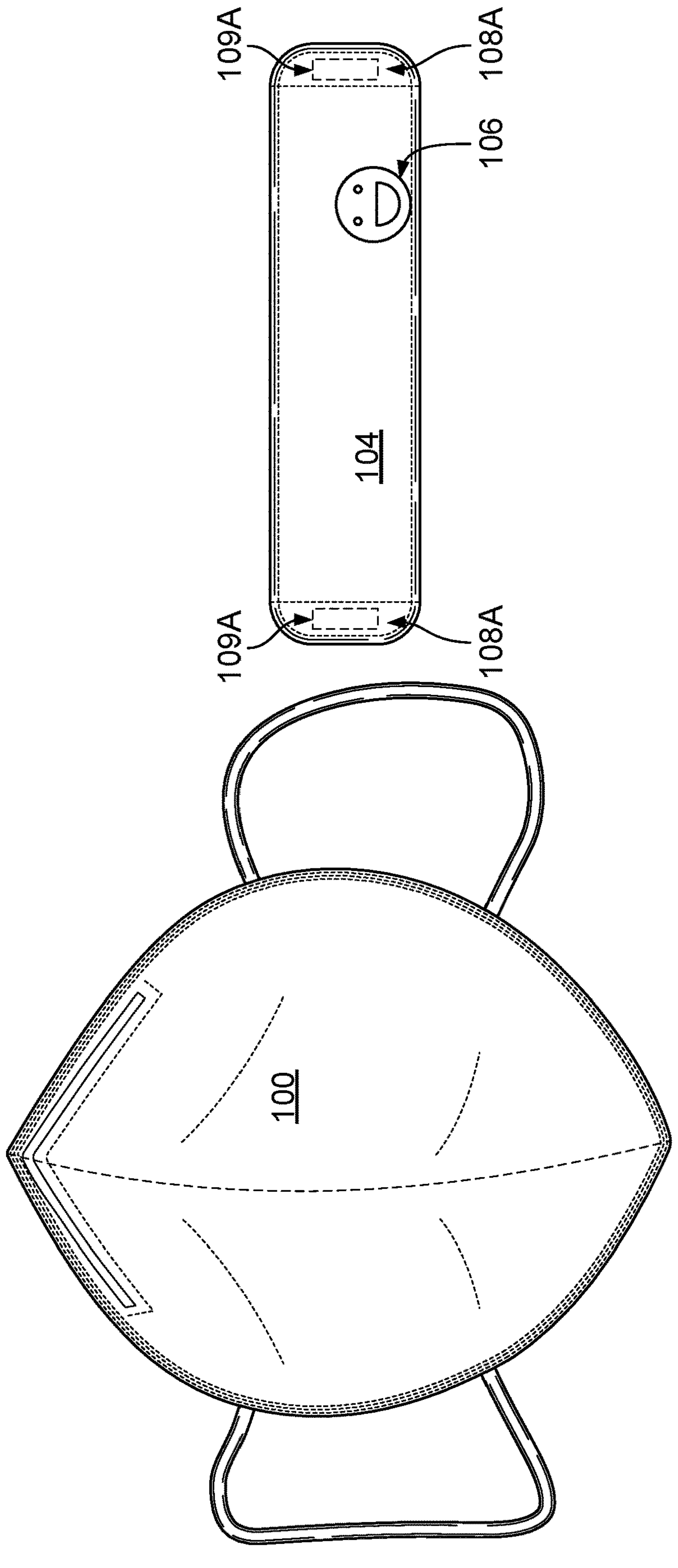

FIGS. 2A-B depict the FFR 100 and the mask band 104 of FIGS. 1A-C. As depicted in FIG. 2A, the flaps 108A-B can be made of a material or fabric that fastens or hooks onto an interior of the FFR 100. For example, the flaps 108A-B can have hook fasteners that mate with loop fasteners (e.g., hook and loop) that are integrated into the interior of the FFR 100. As a result, additional components may not be required in or on the mask band 104 to retain the band 104 to the FFR 100.

As depicted in FIG. 2B, the flaps 108A-B can additionally or alternatively include fasteners 109A-B. The fasteners 109A-B can be integrated or sewn into a fabric of the flaps 108A-B. In other implementations, the fasteners 109A-B can be attached to a back side (e.g., interior side) of the flaps 108A-B. The fasteners 109A-B can be adhesive strips, such as tape. The fasteners 109A-B can also be magnets or other ferrous material. In some implementations, where the fasteners 109A-B are magnets, the FFR 100 can include integrated magnets that attach with the fasteners 109A-B. As another example, the FFR 100 may not have magnets and instead, the fasteners 109A-B can couple to themselves when the flaps 108A-B are wrapped around the sides of the FFR 100.

In some implementations, the fasteners 109A-B can be used in addition to a fastening system of the FFR 100, as described herein. Using both the fasteners 109A-B and the fastening system described herein can be advantageous to ensure the mask band 104 does not loosen or detach from the FFR 100 as the user wears the FFR 100.

Figure 3A:
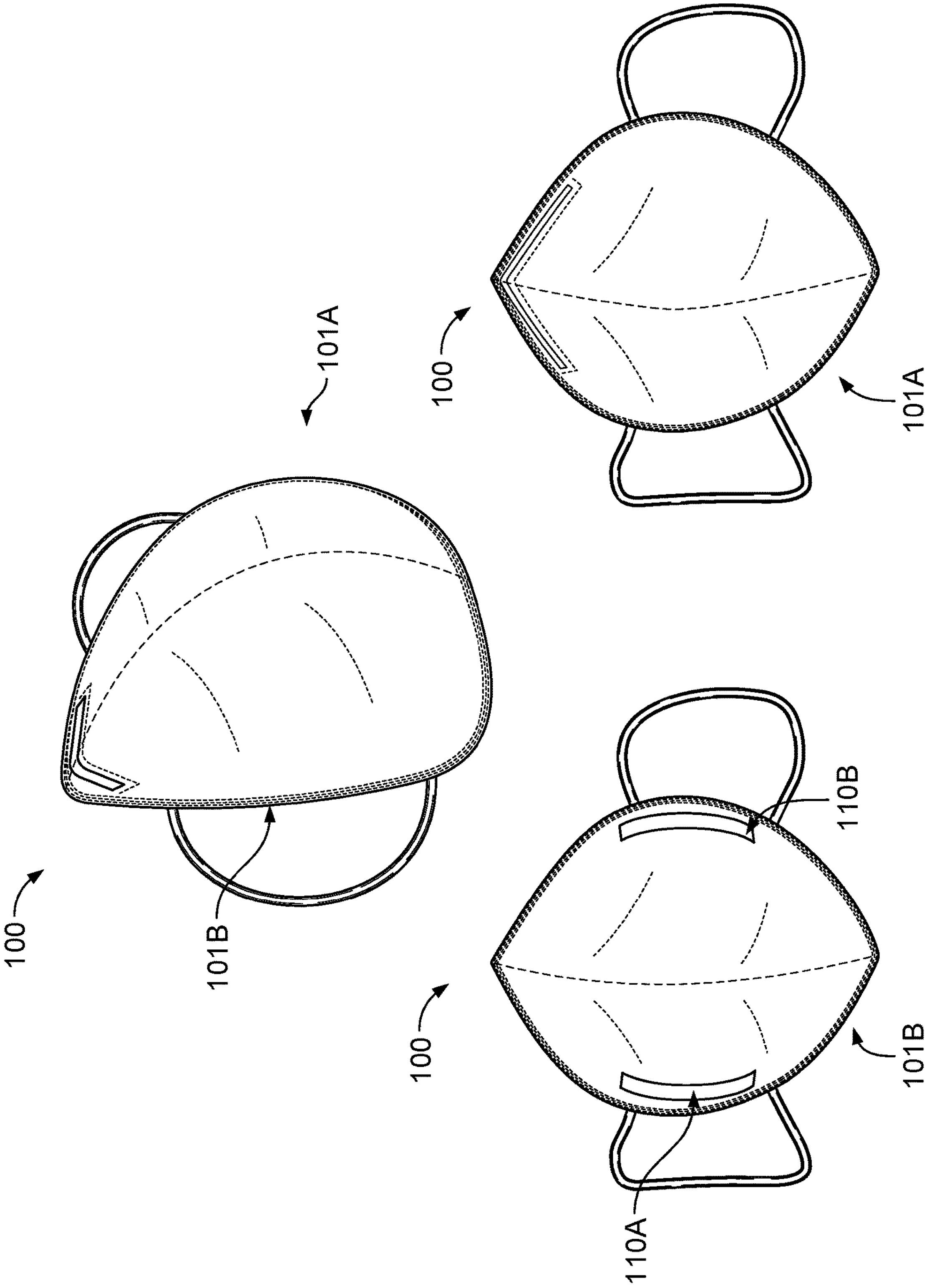
FIGS. 3A-B depict perspective views of the FFR of FIGS. 1A-C with an interior integrated fastening system.
Figure 3B:
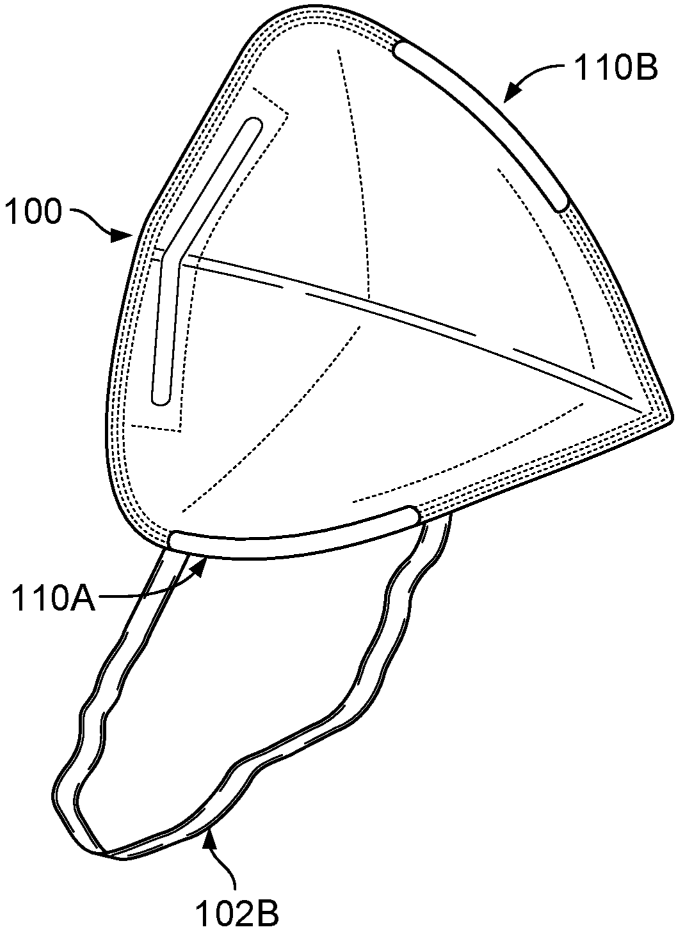

FIGS. 3A-B depict perspective views of the FFR 100 of FIGS. 1A-C with an interior integrated fastening system. Referring to both FIGS. 3A-B, the FFR 100 has a front or exterior side 101A and a back or interior side 101B. The exterior side 101A faces outward, towards people that the user interacts with. A mask band as described throughout this disclosure can be attached to the exterior side 101A. The interior side 101B faces inward and is configured to encapsulate or surround the user's nose and mouth. A mask band as described herein can be attached to the exterior side 101A and wrap around sides of the FFR 100 to fasten to the interior side 101B. As depicted in FIGS. 3A-B, the interior side 101B can have fasteners 110A-B integrated therein. The fasteners 110A-B can be integrated into the FFR 100 at a time of manufacturing the FFR 100. For example, the fasteners 110A-B can be ultrasonically welded in place on the interior side 101B. The fasteners 110A-B can also be attached, welded, or molded onto the interior side 101B via techniques used for creating the FFR 100. As described throughout this disclosure, the fasteners 110A-B can be loop fasteners that mate with hook fasteners on a mask band. The fasteners 110A-B can also be other sticky or mating fabric/material/texture, magnets, and/or adhesives. As depicted in FIG. 3A, the fasteners 110A-B can be offset from side edges of the FFR 100. As depicted in FIG. 3B, the fasteners 110A-B can be integrated along the side edges of the FFR 100. Integration of the fasteners 110A-B along the side edges of the FFR 100 can be advantageous to make the fasteners 110A-B nonobtrusive.

Figure 3C:
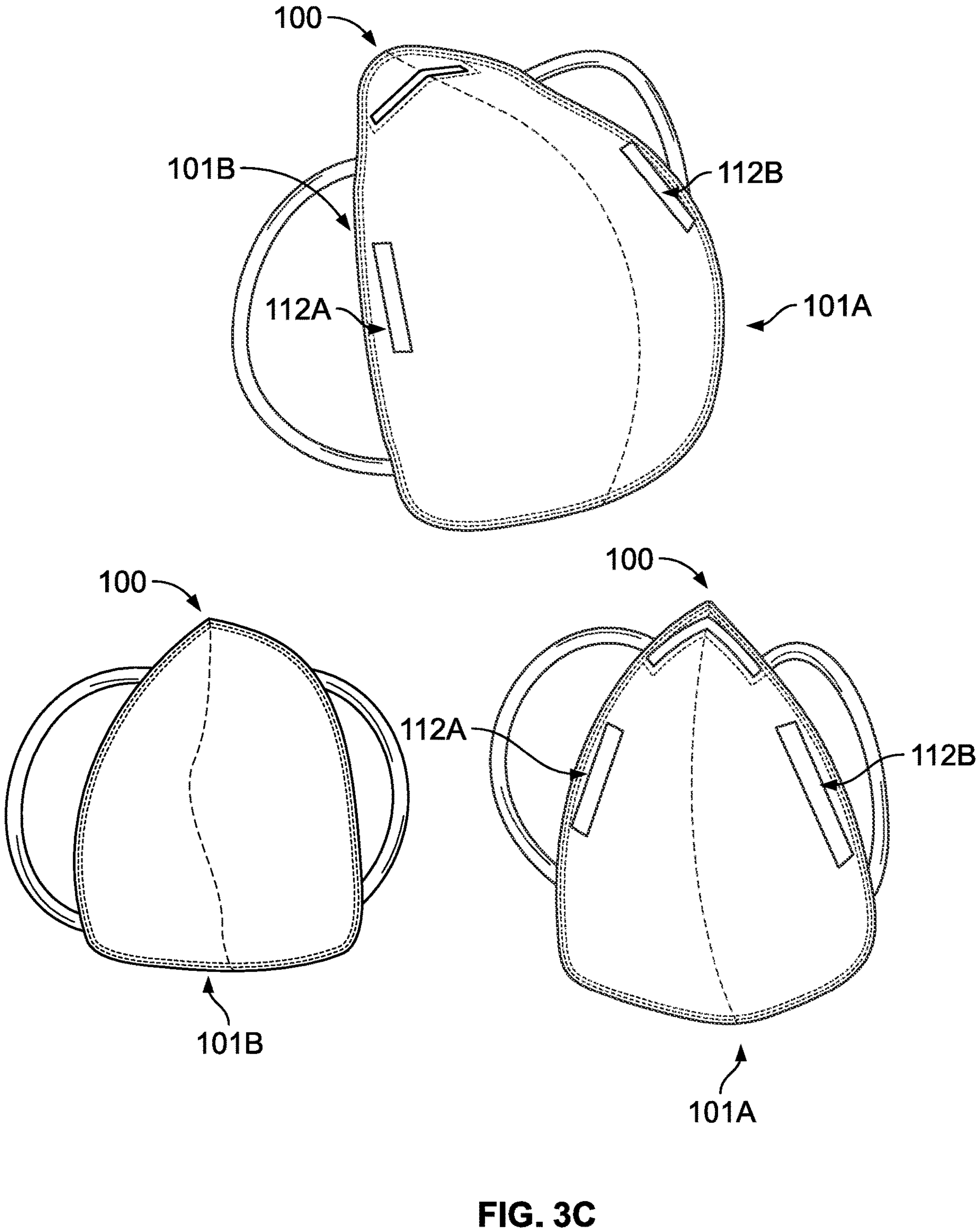
FIGS. 3C-D depict perspective views of the FFR of FIGS. 1A-C with an exterior integrated fastening system.
Figure 3D:
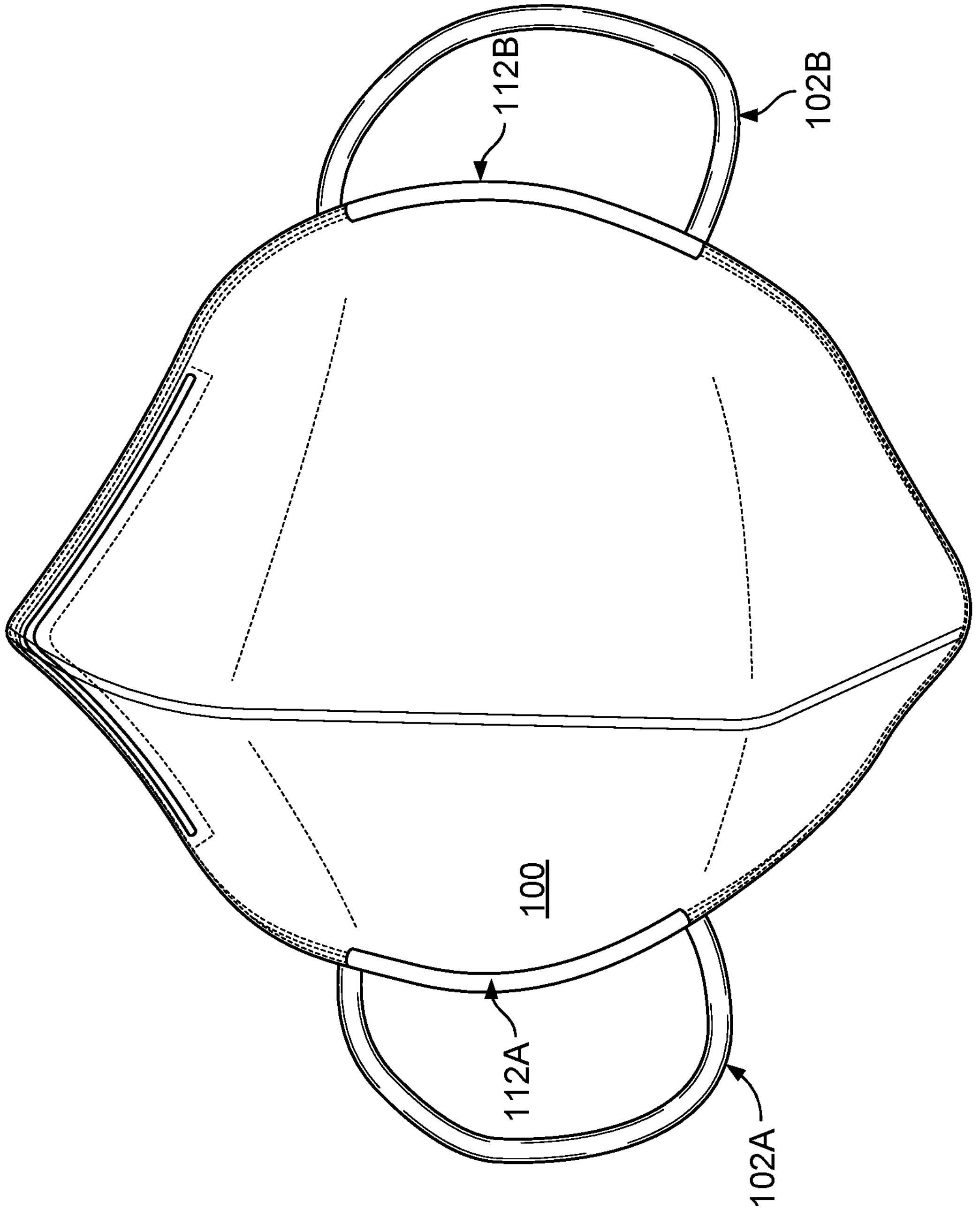

FIGS. 3C-D depict perspective views of the FFR 100 of FIGS. 1A-C with an exterior integrated fastening system. Referring to both FIGS. 3C-D, the exterior side 101A can have fasteners 112A-B integrated therein. The fasteners 112A-B can be integrated into the FFR 100 at a time of manufacturing the FFR 100. For example, the fasteners 112A-B can be ultrasonically welded in place on the exterior side 101A. The fasteners 112A-B can also be attached, welded, or molded onto the exterior side 101A via techniques used for creating the FFR 100. As described throughout this disclosure, the fasteners 112A-B can be loop fasteners that mate with hook fasteners on a mask band. The fasteners 112A-B can also be other sticky or mating fabric/material/texture, magnets, and/or adhesives. As depicted in FIG. 3C, the fasteners 112A-B can be offset from side edges of the FFR 100. As depicted in FIG. 3D, the fasteners 112A-B can be integrated along the side edges of the FFR 100. Integration of the fasteners 112A-B offset from the side edges and/or along the side edges of the FFR 100 can be advantageous to make the fasteners 112A-B nonobtrusive and wearing the FFR 100 more comfortable.

Figure 3E:
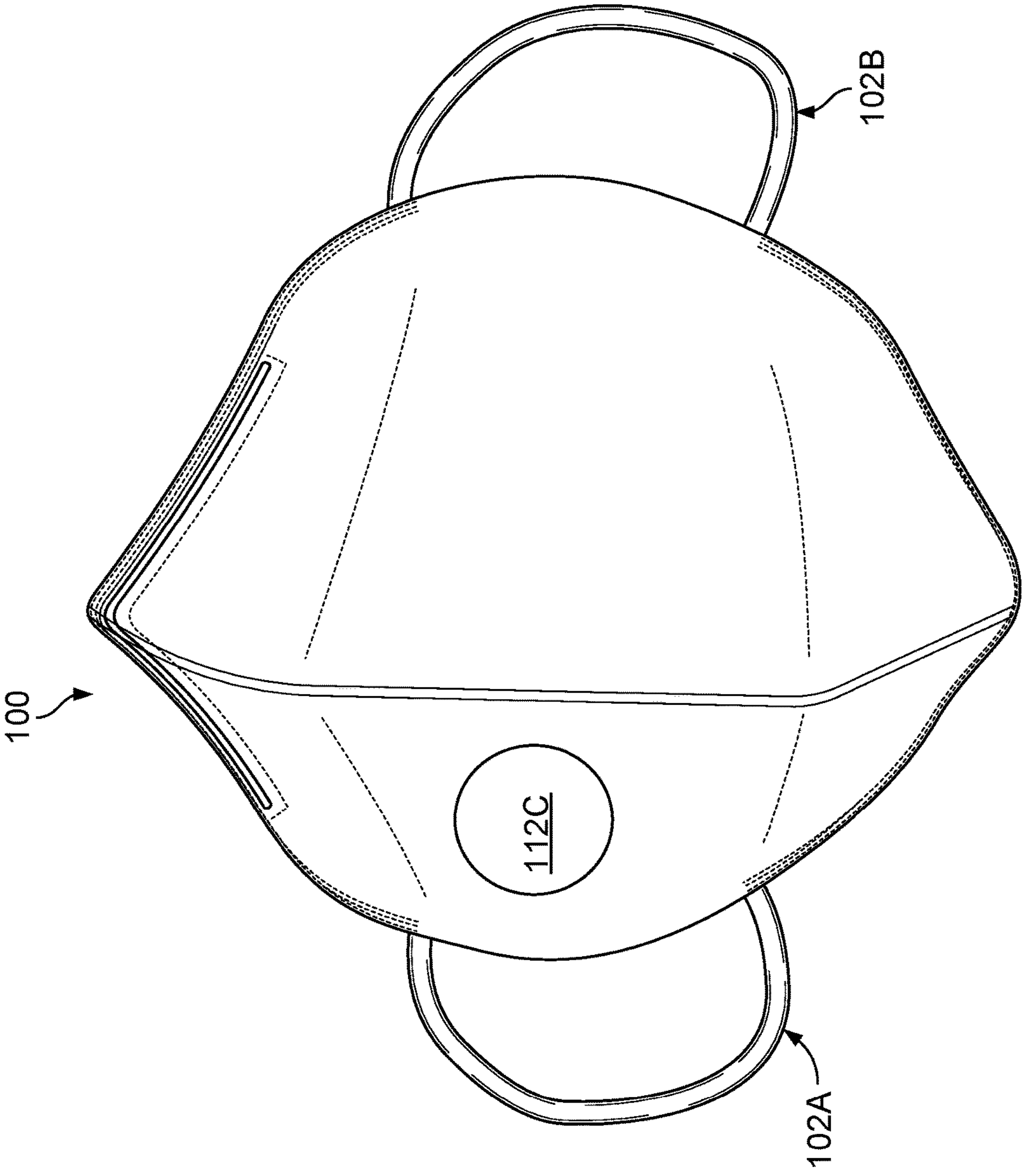
FIGS. 3E-F depict perspective views of the FFR of FIGS. 1A-C with another exterior integrated fastening system.
Figure 3F:
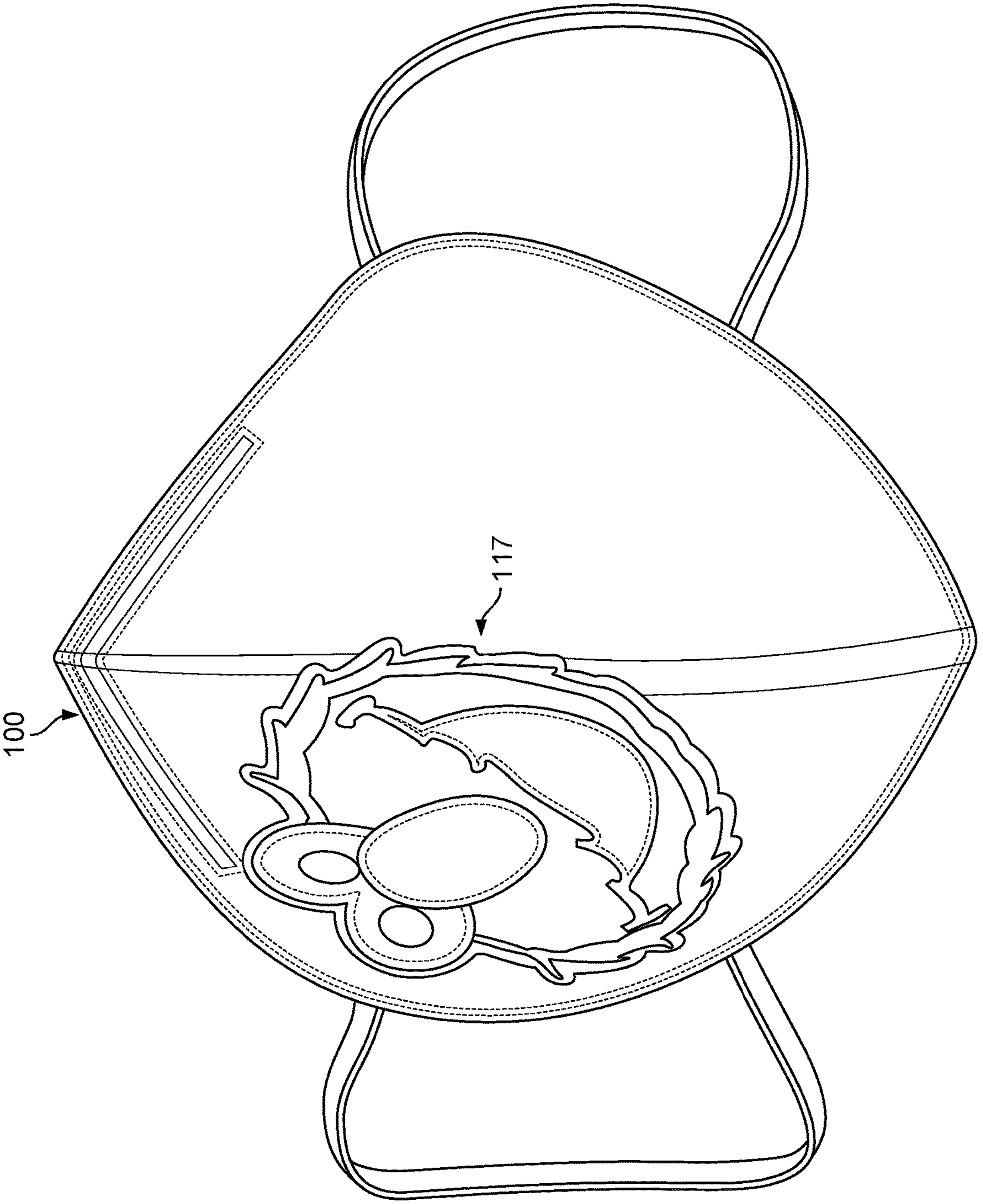

FIGS. 3E-F depict perspective views of the FFR 100 of FIGS. 1A-C with another exterior integrated fastening system. Referring to both FIGS. 3E-F, the exterior side 101A can have at least one fastener 112C integrated therein. The fastener 112C can be integrated into the FFR 100 at a time of manufacturing, as described above. The fastener 112C can be integrated into any portion of the exterior side of the FFR 100. For example, the fastener 112C can be integrated into a portion of the FFR 100 that is close to a side or edge of the FFR 100. The fastener 112C can be integrated into the FFR 100 a distance between a midpoint of the FFR 100 to a lateral edge of the FFR 100 that is equal to a predetermined percent of the FFR 100's size.

As an illustrative example, the fastener 112C can be integrated into the FFR 100 at least one inch from the midpoint of the FFR 100 towards either lateral edge of the FFR 100. One inch from the midpoint of the FFR 100 can be beneficial for FFR 100*s* that are intended for children (e.g., child masks). As another illustrative example, the fastener 112C can be integrated into the FFR 100 at least two inches from the midpoint of the FFR 100 towards either lateral edge of the FFR 100. Two inches from the midpoint of the FFR 100 can be beneficial for FFR 100*s* that are intended for adults (e.g., adult masks). Moreover, the fastener 112C can be manufactured and integrated into the FFR 100 so that it covers no more than 15% of the FFR 100's total surface. As a result, integration of the fastener 112C may not obstruct airflow and other filtration techniques of the FFR 100. Placement of the fastener 112C integration can vary depending on one or more factors, including but not limited to a size of the FFR 100, a shape of the FFR 100, and/or a type of the FFR 100.

The fastener 112C can also be integrated into any other portion of the exterior side of the FFR 100 that may not interfere with filtration aspects of the FFR 100. For example, the fastener 112C may not be integrated into a midpoint of the FFR 100 that may cover a user's nose and/or mouth and thus obstruct filtration effects of the FFR 100.

As shown in FIG. 3F, design 117 (e.g., a customizable mask attachment) can be attached directly to the FFR 100. For example, the fastener 112C can be a loop fastener and the design 117 can be manufactured with a hook fastener integrated into an internal surface of the design 117. The internal surface of the design 117 can cover at least a portion of the external surface 101A of the FFR 100 when attached thereto (e.g., when the fastener 112C mates with the fastener of the design 117). As a result, the design 117 can be directly attached to any portion of the FFR 100 in which the fastener 112C has been integrated therein.

Figure 4:
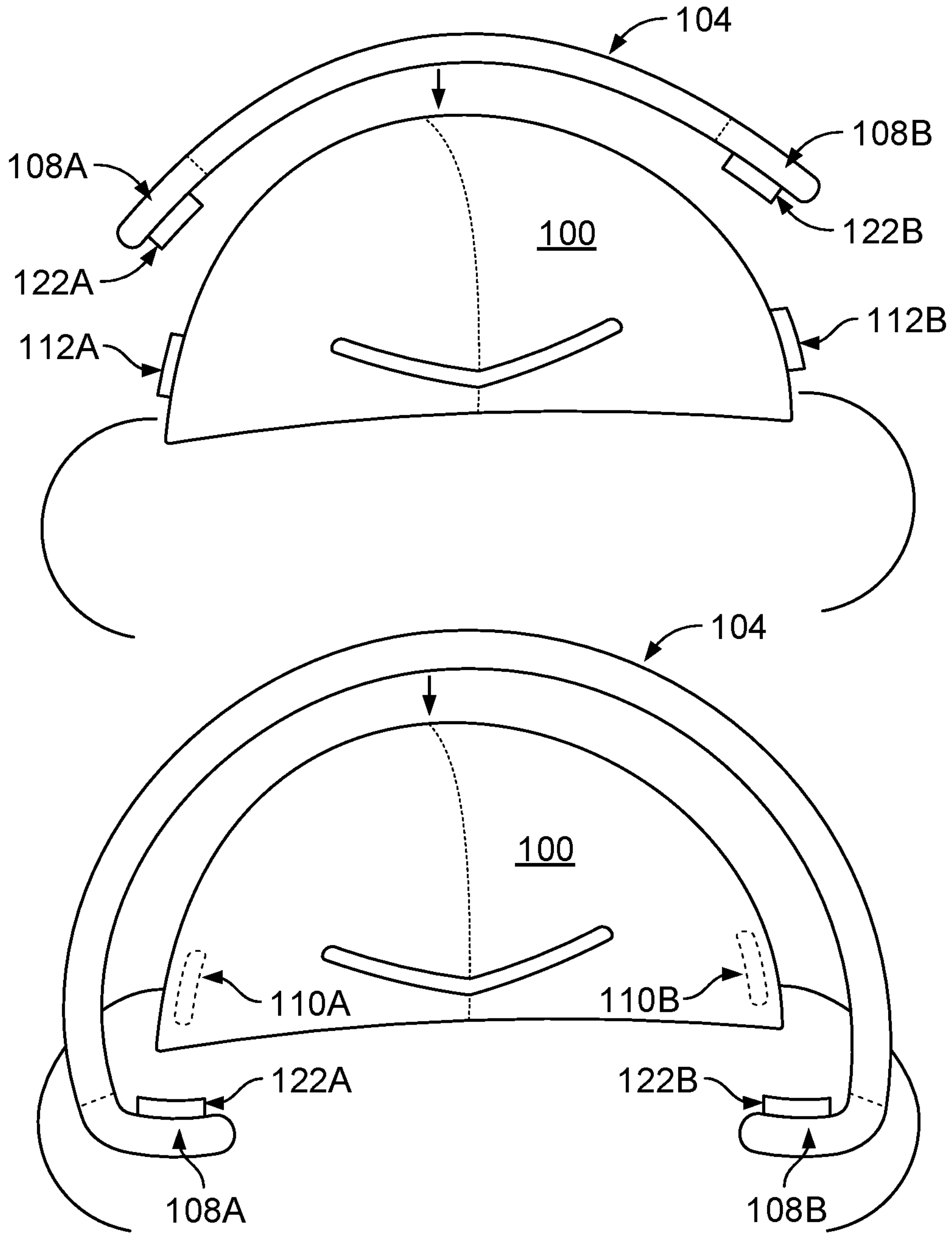
FIG. 4 depicts top views of attaching the mask band to the FFR of FIGS. 1A-C.

FIG. 4 depicts top views of attaching the mask band 104 to the FFR 100 of FIGS. 1A-C. As depicted, the mask band 104 can have fasteners 122A-B on an interior side of the flaps 108A-B. The fasteners 122A-B can be hook fasteners configured to mate with loop fasteners. Where the FFR 100 has the fasteners 112A-B (e.g., loop fasteners) integrated into the exterior side of the FFR 100 (e.g., refer to FIGS. 3C-D), the fasteners 122A-B can hook/attach/fasten to the fasteners 112A-B. Therefore, the flaps 108A-B do not wrap around side edges of the FFR 100. Where the FFR 100 has the fasteners 110A-B (e.g., loop fasteners) integrated into the interior side of the FFR 100 (e.g., refer to FIGS. 3A-B), the fasteners 122A-B can hook/attach/fasten to the fasteners 110A-B. As a result, the flaps 108A-B can wrap around the side edges of the FFR 100 such that the fasteners 122A-B can mate with the fasteners 110A-B and secure the mask band 104 in place.

Figure 5:
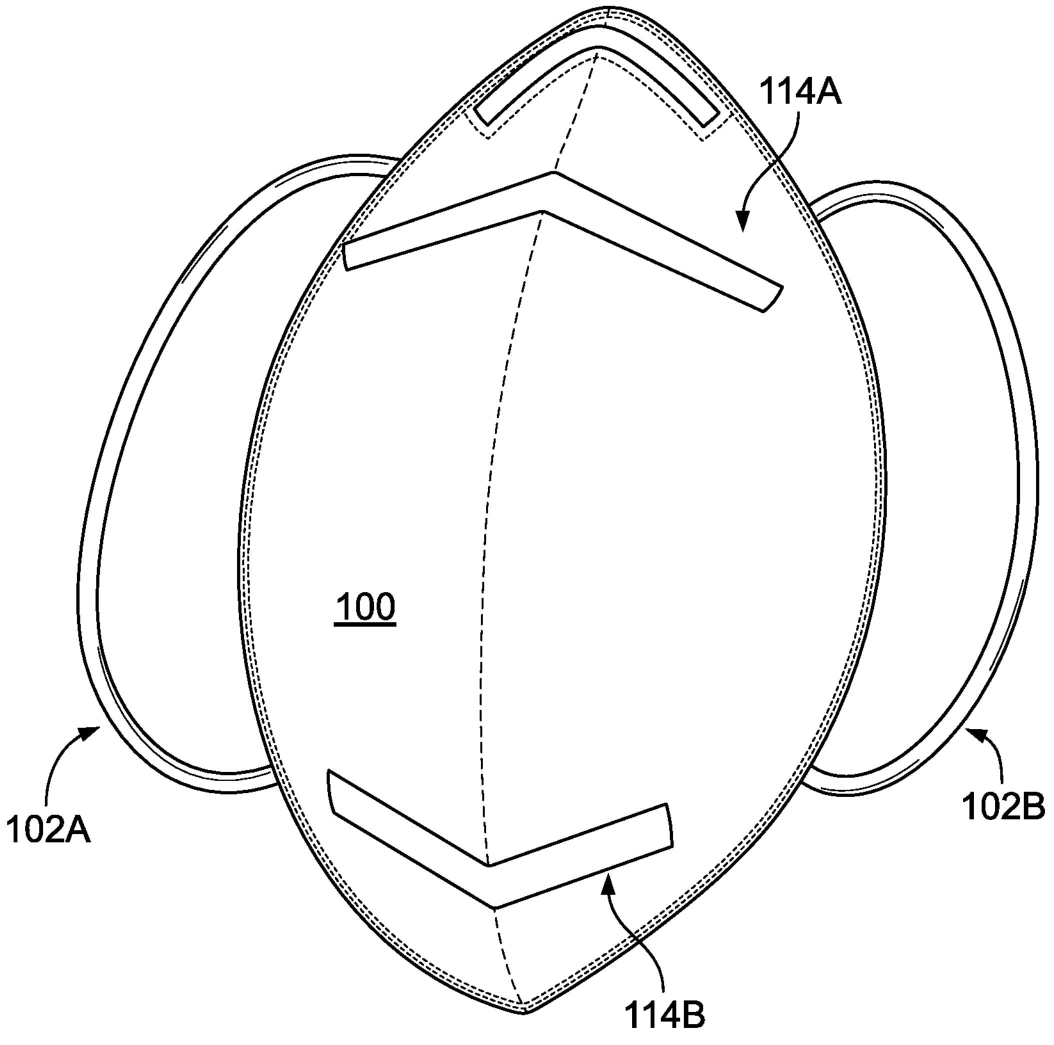
FIG. 5 depicts an exterior integrated fastening system of the FFR of FIGS. 1A-C.

FIG. 5 depicts an exterior integrated fastening system of the FFR 100 of FIGS. 1A-C. As depicted, fasteners 114A-B can be laterally integrated into an exterior side of the FFR 100. The fasteners 114A-B can be adhesive strips. In other implementations, the fasteners 114A-B can be loop fasteners or another sticky or mating fabric/material/texture, magnets, and/or adhesives. Fewer or additional fasteners 114A-B can be integrated into the exterior side of the FFR 100. Moreover, fewer or additional fasteners 114A-B can be integrated into different portions of the exterior side of the FFR 100. For example, one or more of the fasteners 114A-B can be integrated closer to a center of the exterior side of the FFR 100. Using the fasteners 114A-B, a mask band as described herein can be directly affixed to the exterior side of the FFR 100.

Figure 6A:
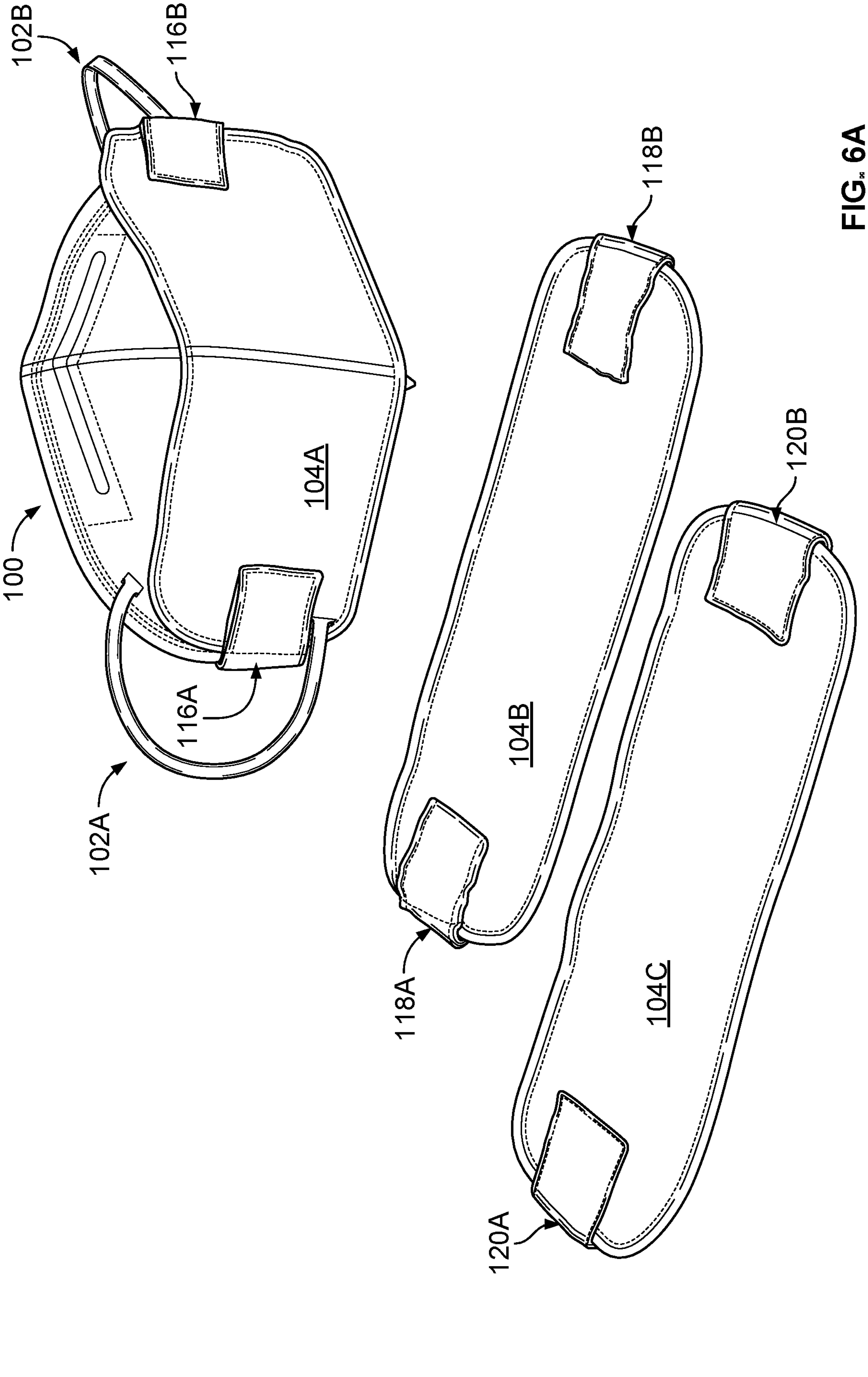
FIGS. 6A-C depict example mask bands with the FFR of FIGS. 1A-C.
Figure 6B:
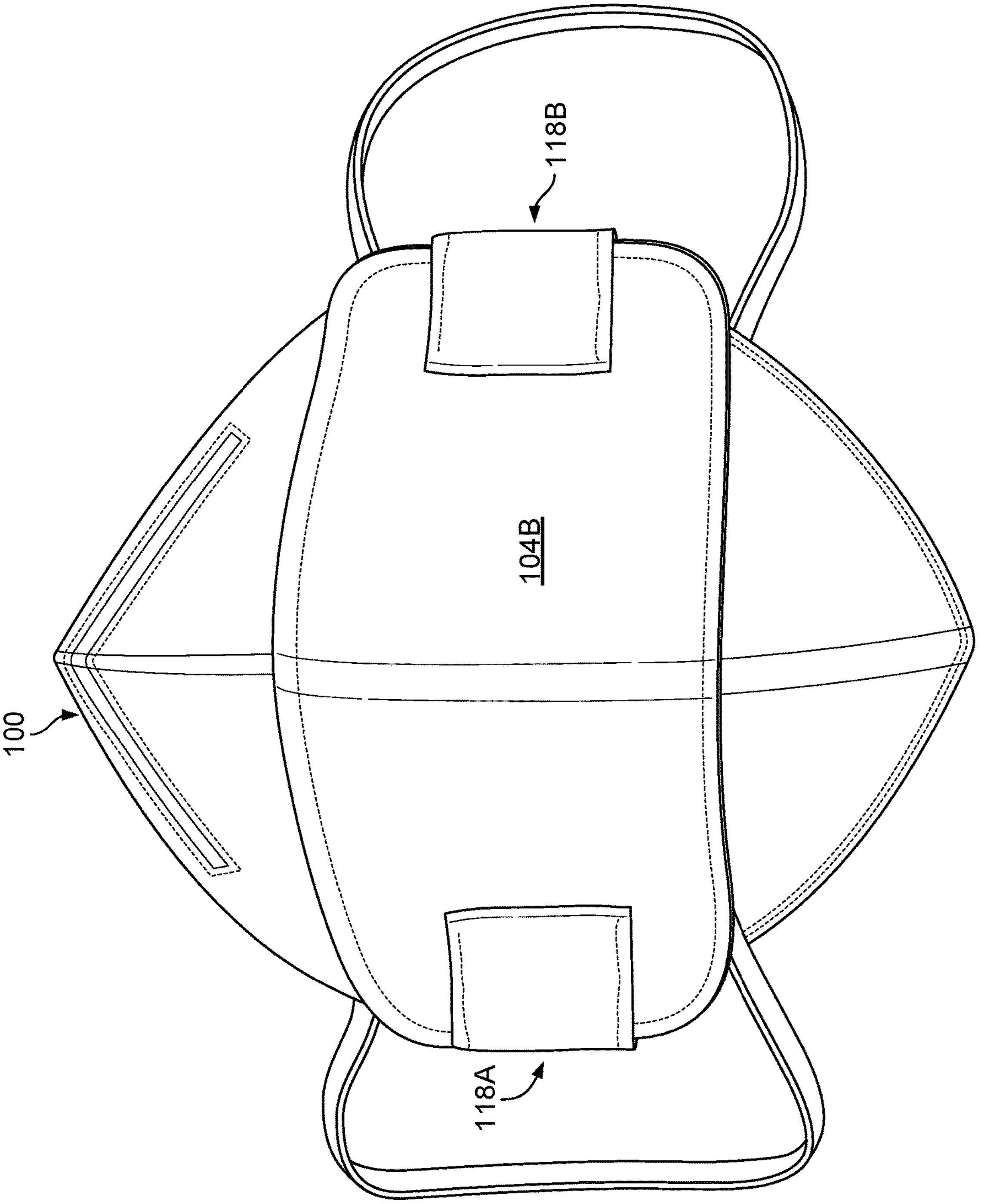
Figure 6C:
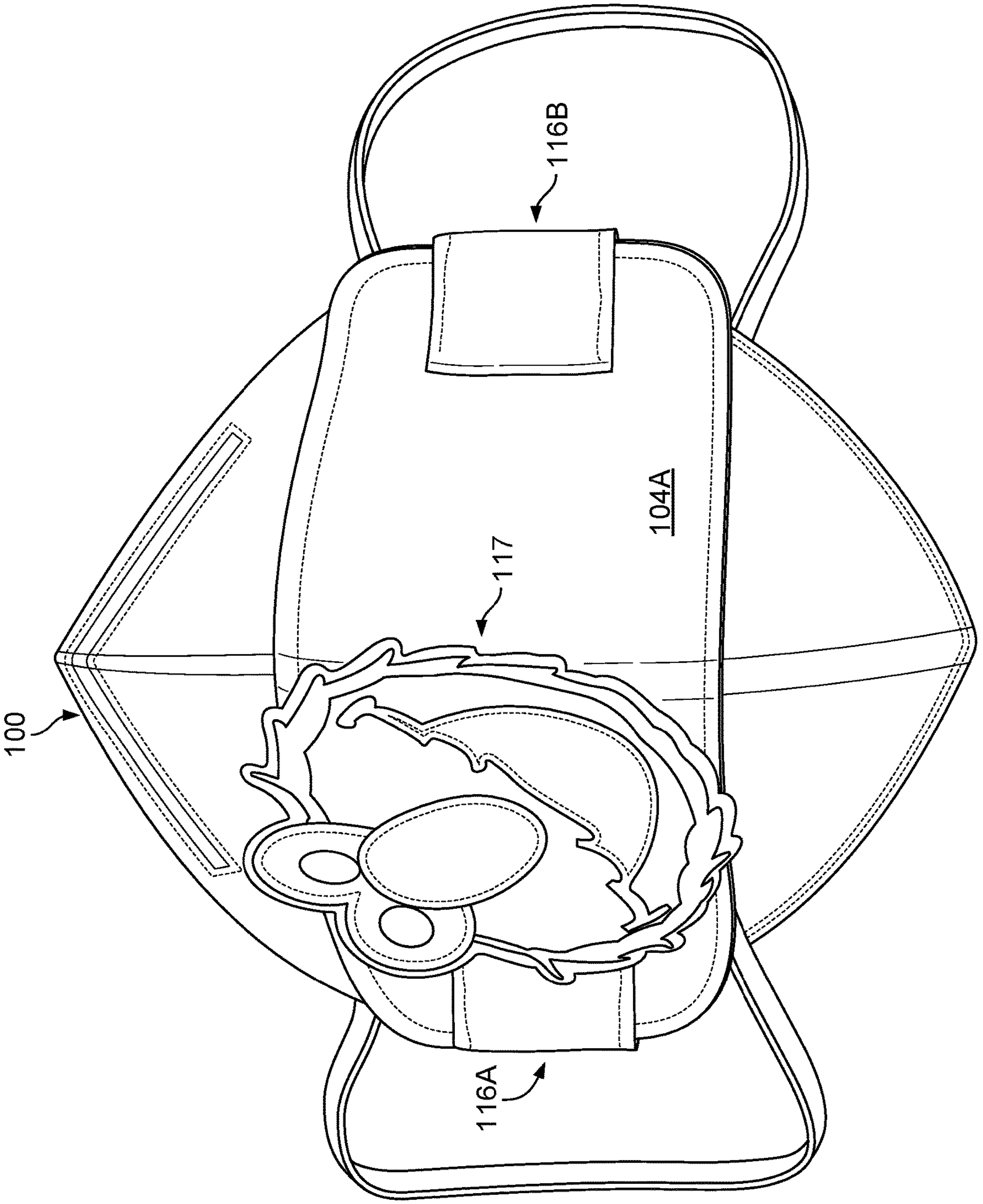

FIGS. 6A-C depict example mask bands 104A-C with the FFR 100 of FIGS. 1A-C. As depicted in FIGS. 6A-C, different mask bands 104A-C can be attached or affixed to the FFR 100 using the techniques described herein. For example, each of the mask bands 104A-C can have different designs or customizations (e.g., refer to design 117 on the mask band 104A in FIG. 6C). The mask band 104A can include fastening portions 116A-B for attaching the mask band 104A to the FFR 100. Similarly, the mask band 104B includes fastening portions 118A-B and the mask band 104C includes fastening portions 120A-B. Each of the mask bands 104A-C can have different fasteners or attaching mechanisms in the fastening portions 116A-B, 118A-B, and 120A-B, respectively. For example, one or more of the fastening portions 116A-B, 118A-B, and 120A-B can include magnets, adhesive strips, hook fasteners, or other sticky or mating fabric/material/texture that can attach or fasten to the integrated fastening system (e.g., loop fasteners) of the FFR 100, as described throughout this disclosure. This configuration is advantageous because the user can easily interchange and reuse different mask bands 104A-C with the same FFR 100. After all, the fastening system of the FFR 100 remains integrated in the FFR 100, thereby providing for attachment of any mask band. The user can change their mask band based on patients they are dealing with or a setting that they will be in. This type of customization is advantageous to reduce maskphobia and to provide customization to FFRs that typically are not customizable.

Figure 6D:
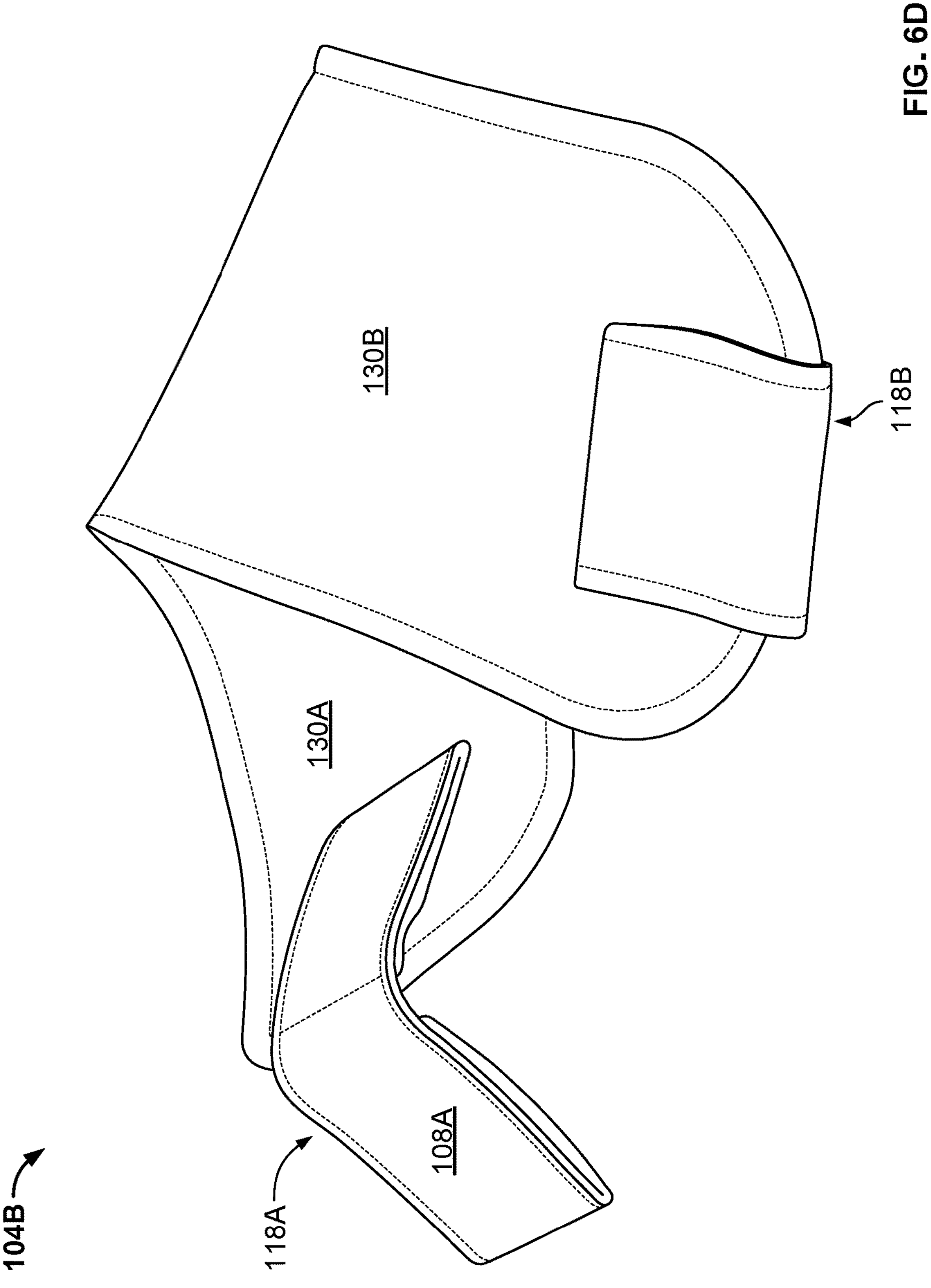
FIGS. 6D-F depict a fastening system of the mask bands of FIGS. 6A-C.
Figure 6E:
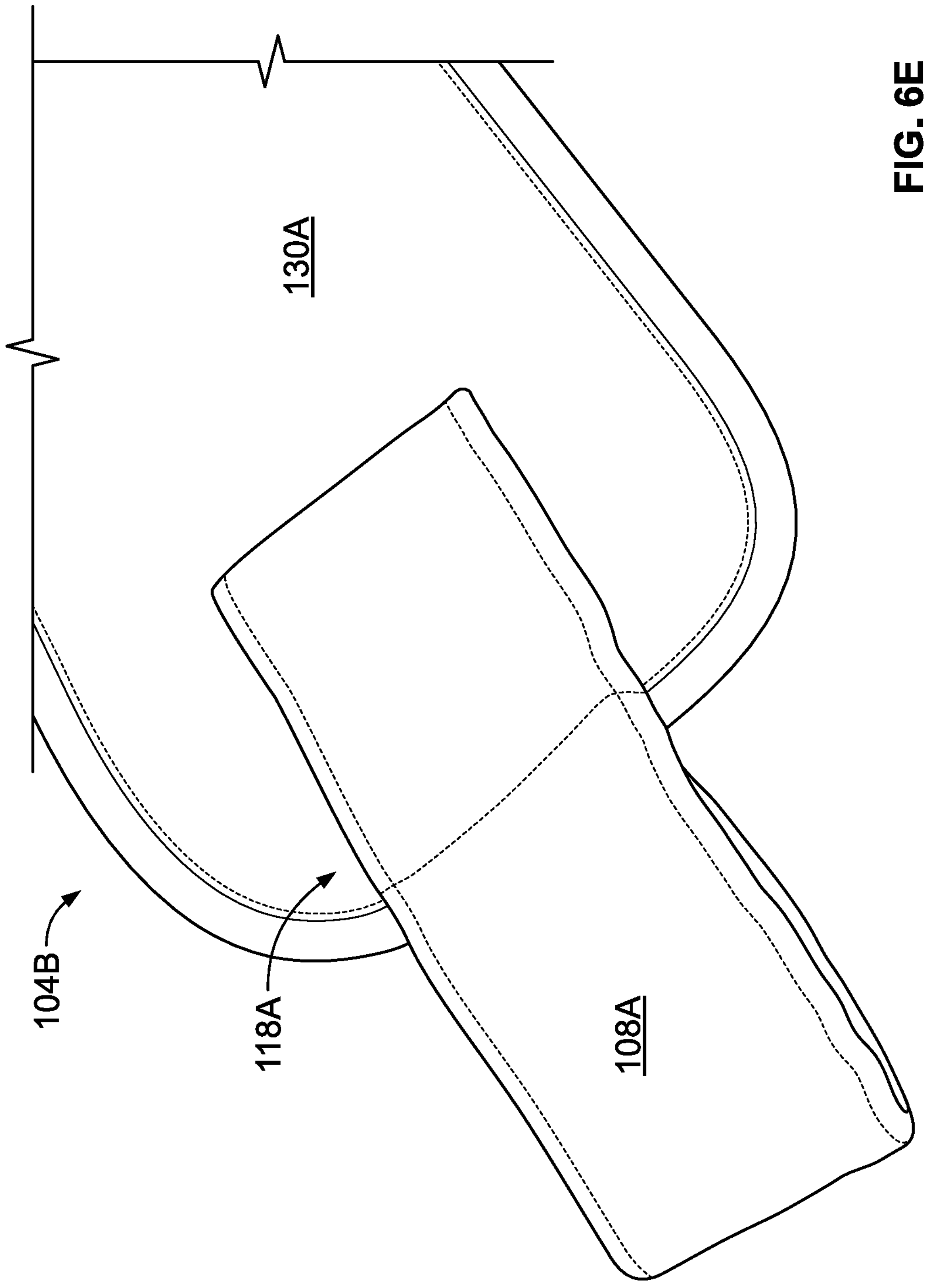
Figure 6F:
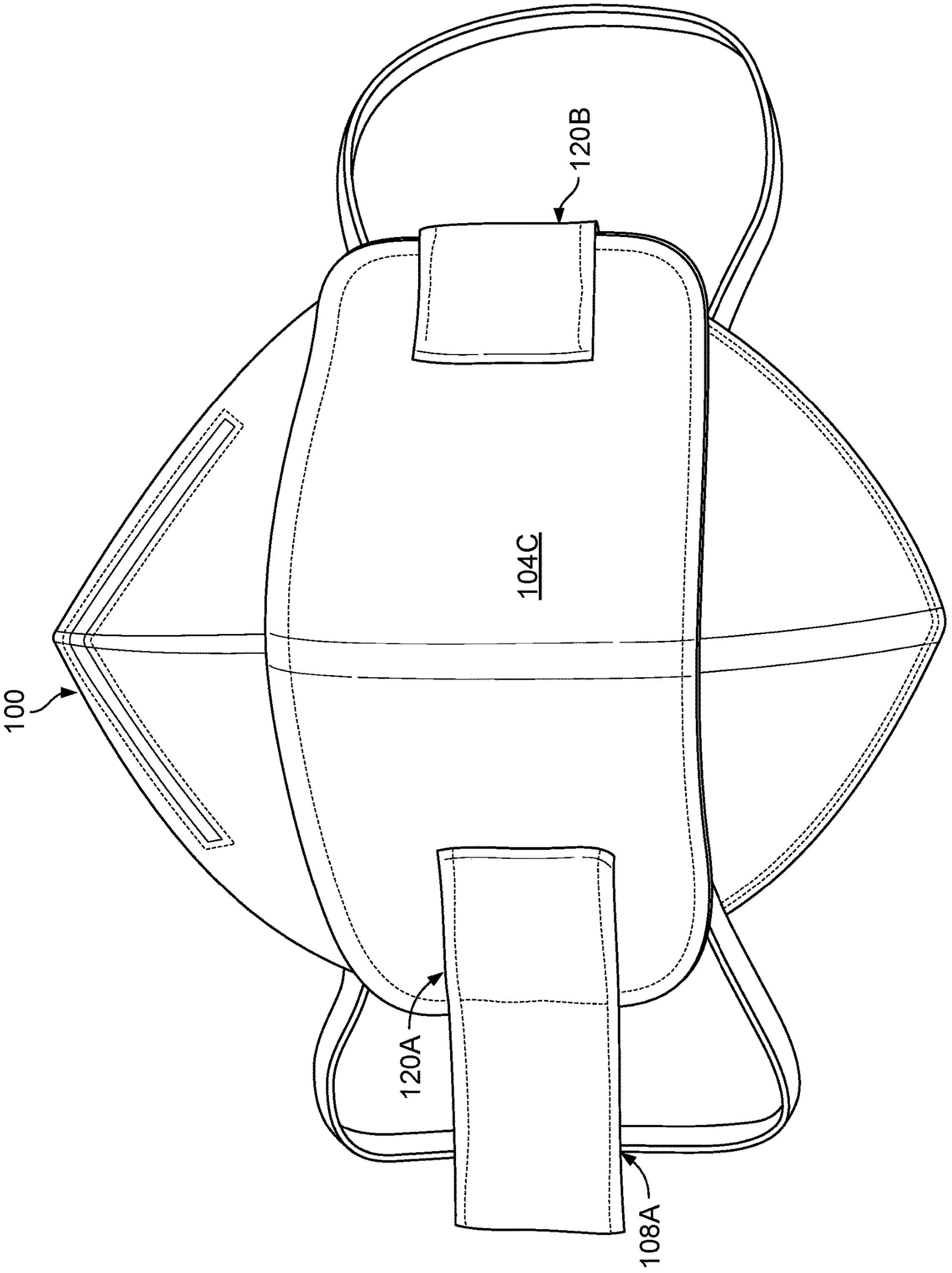

FIGS. 6D-F depict a fastening system of the mask bands 104A-C of FIGS. 6A-C. As depicted in FIG. 6D, the mask band 104B includes an exterior side 130A and an interior side 130B. Each of the masks 104A-C can have exterior and interior sides. The fastening portions 118A-B can be configured to (e.g., sewn into) the exterior side 130A of the mask band 104B. In other implementations, the fastening portions 118A-B can be configured to the interior side 130B of the mask band 104B. As depicted, the fastening portions 118A-B can have a pattern or design to be more aesthetically pleasing. In other implementations, the fastening portions 118A-B can be a same color as the FFR and/or the mask band 104B. Therefore, the fastening portions 118A-B can blend in or camouflage with the FFR and/or the mask band 104B, which can be more aesthetically pleasing.

Referring to FIGS. 6D-E, the fastening portions 118A-B can include the flaps 108A-B (e.g., refer to FIGS. 2A-B). The flaps 108A-B can include a fastening mechanism to attach to the integrated fastening system of the FFR. For example, the flaps 108A-B can include magnets sewn into a fabric of the flaps 108A-B, and/or adhesives attached to an outside of the fabric of the flaps 108A-B. In some implementations, the flaps 108A-B can be made of sticky or mating fabric/material/texture (e.g., hook fasteners) that attaches or fastens to the integrated fastening system (e.g., loop fasteners) of the FFR.

Referring to FIG. 6F, the mask band 104C includes the fastening portions 120A-B having the flaps 108A-B, as described in reference to the other mask bands 104A-C above. The flaps 108A-B can wrap around side edges of the FFR 100 and attach to the interior side of the FFR 100. For example, the fastening portions 120A-B and the flaps 108A-B can each include magnets or other ferrous material. When the flaps 108A-B wrap around the side edges of the FFR 100, the magnets in the flaps 108A-B can be attracted to magnets in the fastening portions 120A-B. Thus, the mask band 104C can be configured or affixed to the FFR 100. In other examples, as described herein, the flaps 108A-B can be made of a sticky material or have hook fasteners that are configured to mate with or attach to loop fasteners that are integrated into the interior side of the FFR 100.

Figure 7:
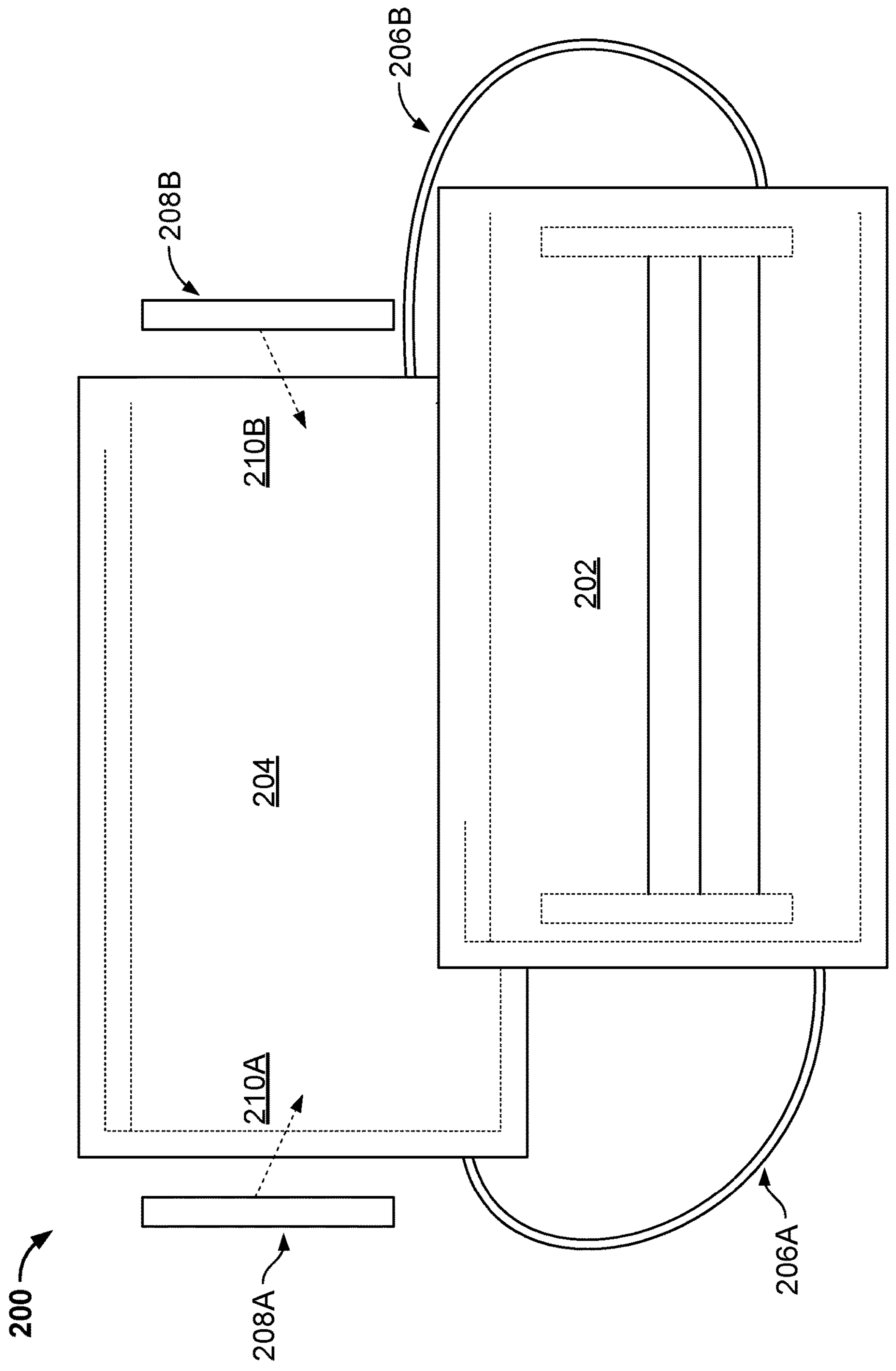
FIG. 7 depicts integration of another example FFR with a fastening system.

FIG. 7 depicts integration of another example FFR 200 with a fastening system 208A-B. The FFR 200 can be a regulatory compliant mask, such as a surgical facemask. One or more embodiments and/or fastening systems described in reference to the FFR 100 of FIGS. 1-6 can be applicable to the FFR 200, which is described in further detail below. The FFR 200 can be comprised of multiple components. As depicted, the FFR 200 includes a front or external layer 202, a back or interior layer 204, straps 206A-B, and the fasteners 208A-B. Traditionally, the external layer 202, the interior layer 204, and the straps 206A-B can be welded or molded together using molding or other manufacturing techniques (e.g., ultrasonic welding). As described herein, the fasteners 208A-B can also be welded or molded with these components at a time of manufacturing the FFR 200. As a result, the fasteners 208A-B can be integrated into the FFR 200.

Components of the FFR 200 can be welded together along seams or stitching as indicated by dashed lines in the external layer 202 and the internal layer 204. In some implementations, the fasteners 208A-B can be welded in between the external layer 202 and the internal layer 204 at locations 210A-B of the internal layer 204. In other implementations, the fasteners 208A-B can be welded onto an external (e.g., user-facing side) side of the internal layer 204 and/or an external (e.g., outward facing side) side of the external layer 202. The fasteners 208A-B can be loop fasteners other sticky or mating fabric/material/texture that can receive fasteners, such as hook fasteners, on a mask band, as described herein. In other implementations, the fasteners 208A-B can be adhesive strips, other forms of adhesive, magnets, and/or any other type of fastening means.

Figure 8:
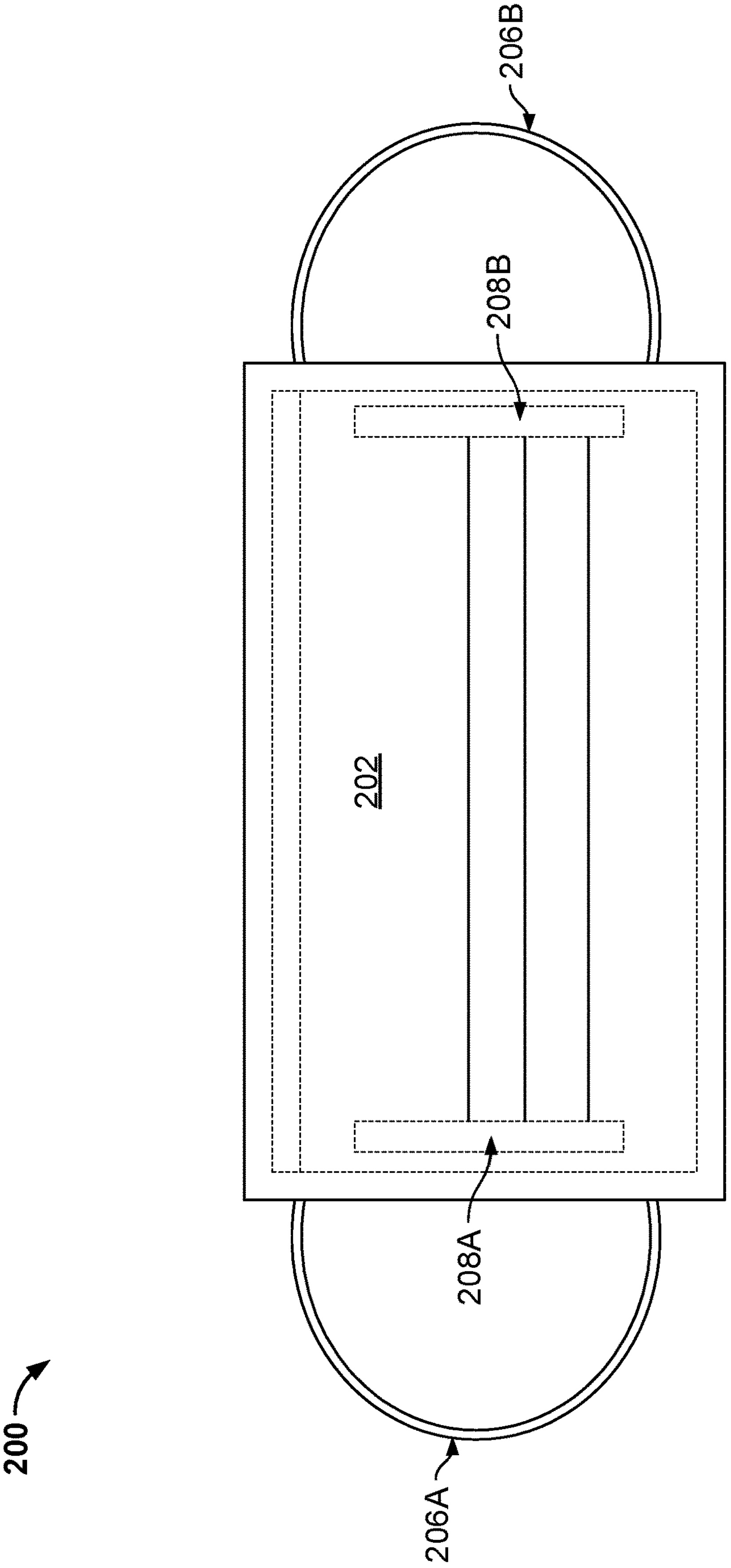
FIG. 8 is a front view of the FFR of FIG. 7 having the interior integrated fastening system.

FIG. 8 is a front view of the FFR 200 of FIG. 7 having an interior integrated fastening system. As depicted, the external layer 202 of the FFR 200 does not include fasteners. However, the fasteners 208A-B, which were welded and integrated into the FFR 200 during manufacturing, can be on the external side of the internal layer of the FFR 200 (e.g., refer to FIG. 7). Since the fasteners 208A-B are on the external side of the internal layer of the FFR 200, a mask band can be placed over the external layer 202 and wrap around side edges of the FFR 200 to attach or fasten to the fasteners 208A-B.

The fasteners 208A-B can be integrated along stitching and/or seams of the FFR 200. In some implementations, the fasteners 208A-B can be integrated along side edges of the FFR 200. In yet other implementations, the fasteners 208A-B can be integrated into one or more different portions of the FFR 200 (e.g., closer to a center of the internal layer). One or more fewer or additional fasteners 208A-B can be integrated into the internal layer.

Figure 9:
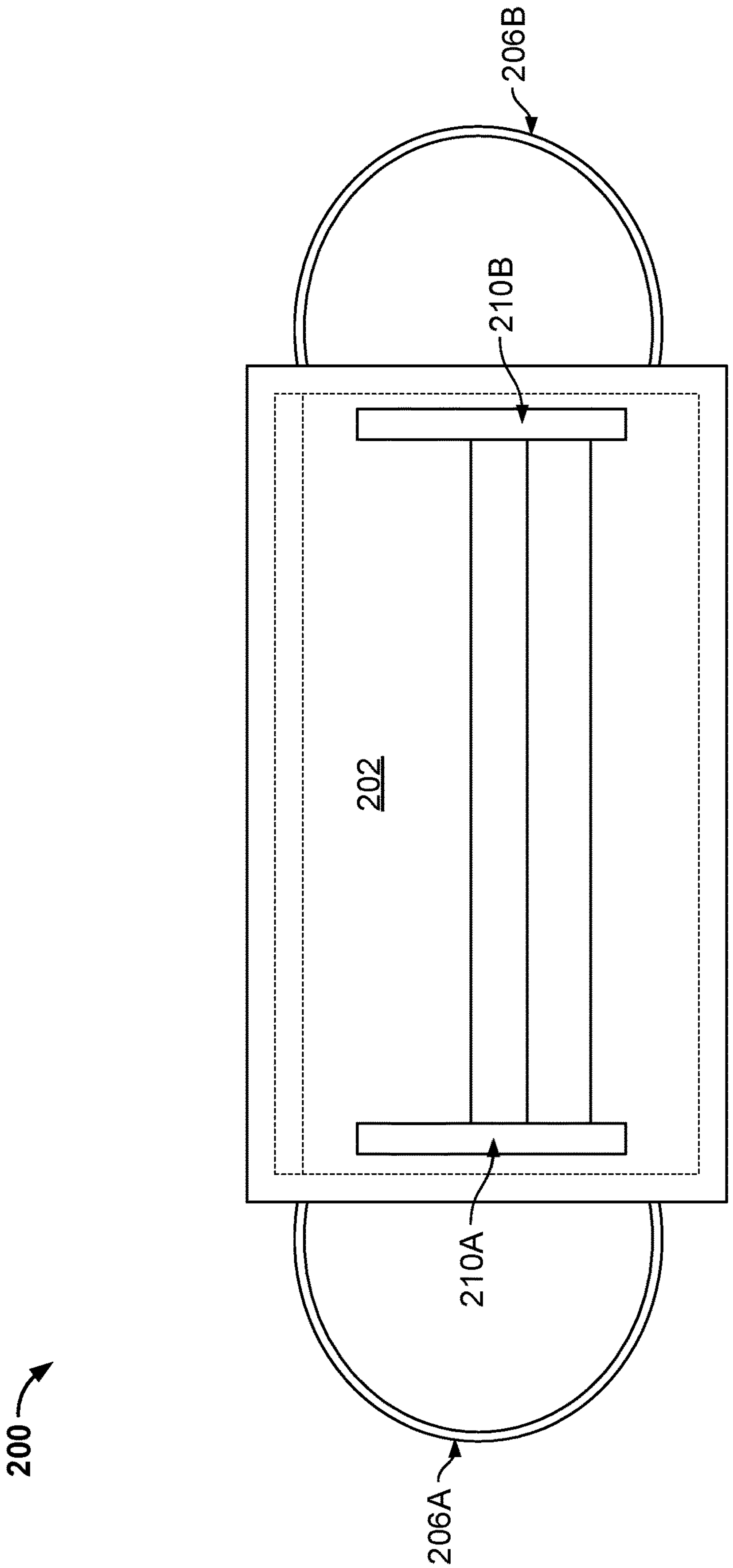
FIG. 9 is a front view of the FFR of FIG. 7 having an exterior integrated fastening system.

FIG. 9 is a front view of the FFR 200 of FIG. 7 having an exterior integrated fastening system. As depicted, the external layer 202 of the FFR 200 includes fasteners 210A-B. The fasteners 210A-B can be any type of fasteners as described herein. The fasteners 210A-B can be welded or molded into the external side of the external layer 202 such that the fasteners 210A-B are integrated into the FFR 200. The fasteners 210A-B can be integrated along stitching and/or seams of the FFR 200. In some implementations, the fasteners 210A-B can be integrated along side edges of the FFR 200. In yet other implementations, the fasteners 210A-B can be integrated into one or more different portions of the FFR 200 (e.g., closer to a center of the external layer 202). One or more fewer or additional fasteners 210A-B can be integrated into the external layer 202. For example, the fasteners 210A-B as well as the fasteners 208A-B can be integrated into the FFR 200. Doing so can provide the user with more options for connecting a mask band to the FFR 200. Doing so can also provide for more secure attachment of the mask band to the FFR 200.

Figure 10:
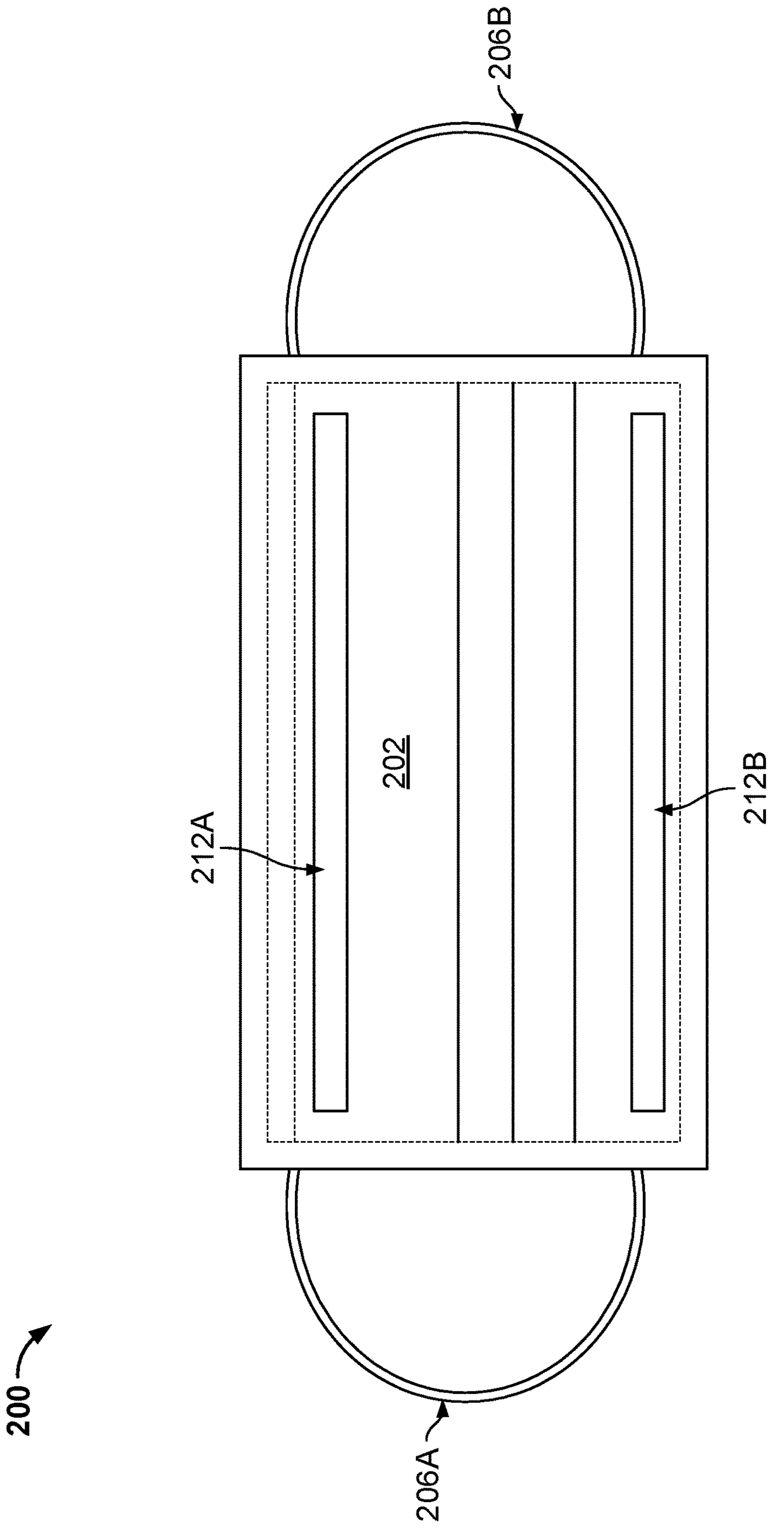
FIG. 10 is a front view of the FFR of FIG. 7 with an exterior integrated fastening system.

FIG. 10 is a front view of the FFR 200 of FIG. 7 with an exterior integrated fastening system. As depicted, the external layer 202 of the FFR 200 includes fasteners 212A-B that are laterally integrated. The fasteners 212A-B can be any type of fasteners as described herein. The fasteners 212A-B can be welded or molded into the external side of the external layer 202 such that the fasteners 212A-B are integrated into the FFR 200. The fasteners 212A-B can be integrated along stitching and/or seams of the FFR 200. In some implementations, the fasteners 212A-B can be integrated along top and bottom edges of the FFR 200. In yet other implementations, the fasteners 212A-B can be integrated into one or more different portions of the FFR 200 (e.g., closer to a center of the external layer 202). One or more fewer or additional fasteners 212A-B can be integrated into the external layer 202. For example, the fasteners 212A-B as well as the fasteners 208A-B and/or the fasteners 210A-B can be integrated into the FFR 200. Doing so can provide the user with more options for connecting a mask band to the FFR 200. Doing so can also provide for more secure attachment of the mask band to the FFR 200.

Figure 11A:
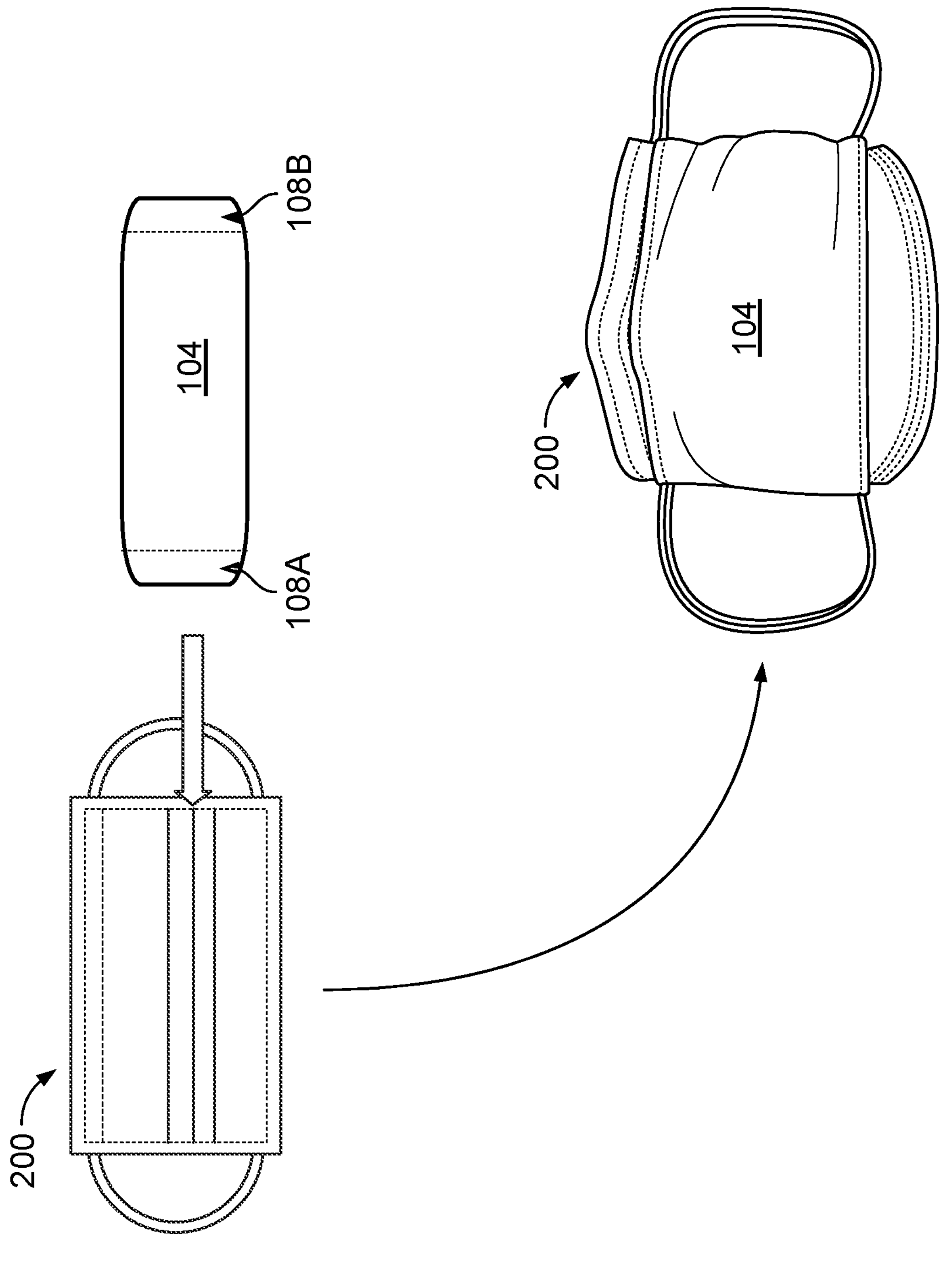
FIG. 11A depicts the FFR of FIG. 7 with the mask band as described herein.

FIG. 11A depicts the FFR 200 of FIG. 7 with the mask band 104 as described herein. As depicted, the mask band 104 can be placed on top of the FFR 200 (e.g., on the external layer of the mask 200). The flaps 108A-B of the mask band 104 can wrap around the side edges of the FFR 200 to hold the mask band 104 in place. The same and/or similar mask band 104 as described in reference to FIGS. 1-6 can be applied or affixed to the FFR 200.

Figure 11B:
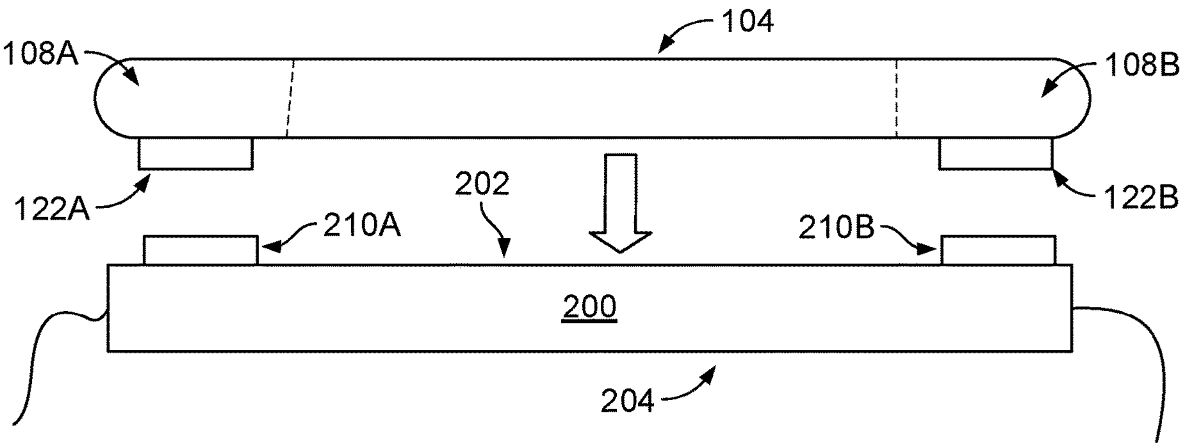
FIG. 11B depicts top views of attaching the mask band to the FFR of FIG. 7.
Figure 11B:
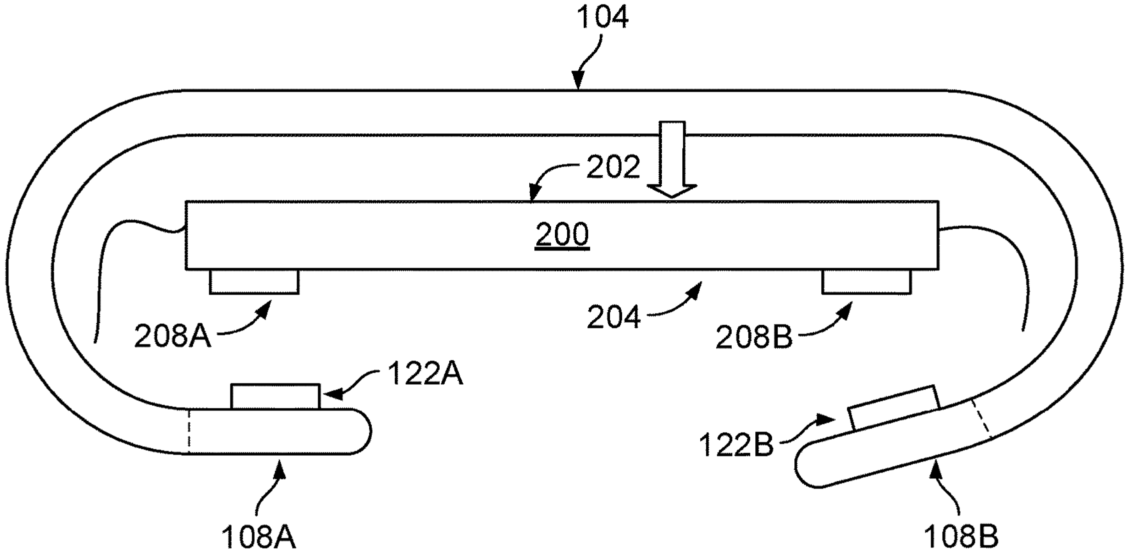

FIG. 11B depicts top views of attaching the mask band 104 to the FFR 200 of FIG. 7. As depicted, the mask band 104 can have fasteners 122A-B on an interior side of the flaps 108A-B. The fasteners 122A-B can be hook fasteners configured to mate with loop fasteners. Where the FFR 200 has the fasteners 210A-B (e.g., loop fasteners) integrated into the external layer 202 of the FFR 200 (e.g., refer to FIGS. 9, 10), the fasteners 122A-B can hook/attach/fasten to the fasteners 210A-B. Therefore, the flaps 108A-B do not wrap around side edges of the FFR 200. Where the FFR 200 has the fasteners 208A-B (e.g., loop fasteners) integrated into the internal layer 204 of the FFR 200 (e.g., refer to FIGS. 7-8), the fasteners 122A-B can hook/attach/fasten to the fasteners 208A-B. As a result, the flaps 108A-B can wrap around the side edges of the FFR 200 such that the fasteners 122A-B can mate with the fasteners 208A-B and secure the mask band 104 in place.

Figure 11C:
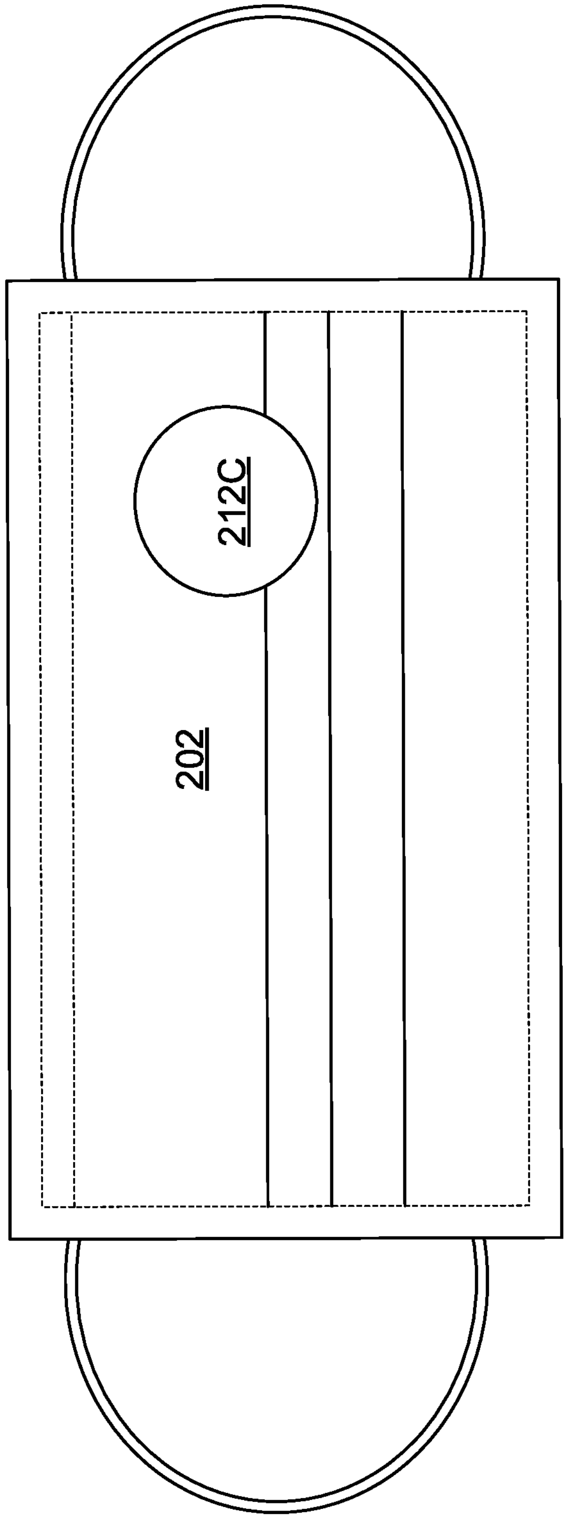
FIG. 11C depicts a front view of the FFR of FIG. 7 having another exterior integrated fastening system.

FIG. 11C depicts a front view of the FFR 200 of FIG. 7 having another exterior integrated fastening system. As described in reference to FIGS. 3E-F, the exterior layer 202 of the FFR 200 can have at least one fastener 212C integrated therein. The fastener 212C can be integrated into the FFR 200 at a time of manufacturing, as described above. The fastener 212C can be integrated into any portion of the exterior side of the FFR 200, as described in reference to FIGS. 3E-F. A customizable mask attachment, such as the design 117 described herein, can then be attached directly to the FFR 200.

FIGS. 12A-G depict example screens from an application for customizing the mask band, a design, or any other customizable mask attachment described herein. The application can be used to customize mask bands, designs (e.g., the design 117), or other customizable mask attachments for different types of masks, such as the FFRs described herein as well as cloth facemasks. The application can be deployed on a mobile device, such as a smartphone, tablet, wearable device, laptop, and/or computer. The device can have a display, such as a touch screen, a microphone, keyboard, mouse, or any other input and output means. The application can be provided to the device via a wireless and/or wired communication/network. The application can be configured to receive input from a user of the mobile device.

Figure 12B:
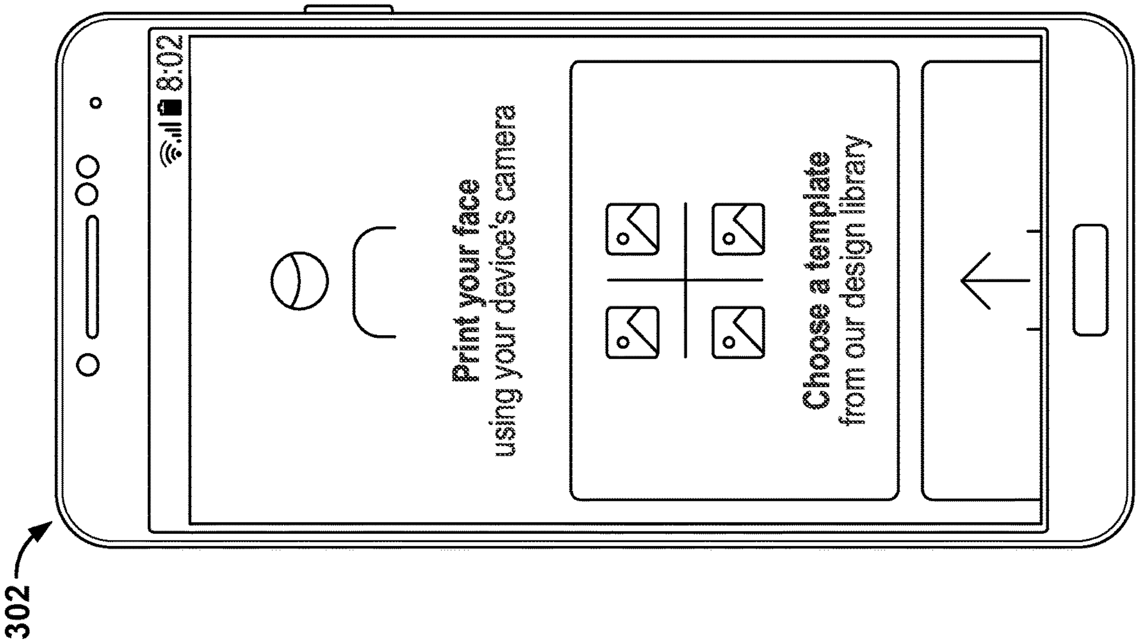
FIGS. 12A-G depict example screens from an application for customizing the mask band, a design, or any other customizable mask attachment described herein.
Figure 12A:
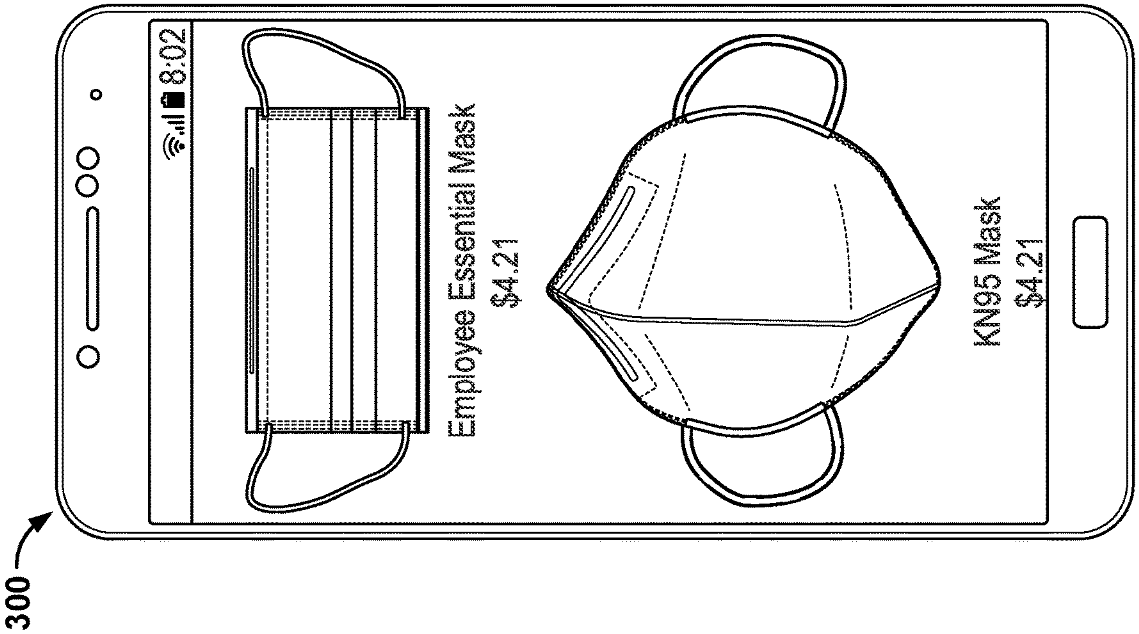

Referring to the figures, FIG. 12A depicts a screen 300. The screen 300 can provide the user with an option to select what type of facemask the user wants to customize. The screen 300 can provide the user with a selection of regulatory compliant masks or FFRs described herein, such as surgical masks, KN95, and N95 masks, as well as cloth facemasks. As depicted in FIG. 12B, once the user selects a type of mask to customize, screen 302 can be presented to the user. When the user selects the type of mask to customize, a mask band size that corresponds to the selected mask type can be automatically chosen. In some implementations, the user can also select a size of the mask band that the user desires. The sizes of the mask band can also be specific to the type of mask that was chosen. In other words, and for example, a KN95 mask may require mask bands that are wider than mask bands for a surgical mask because of the shape of the KN95. As another example, if the user has a smaller face and uses smaller sized masks, the user can select a smaller mask band size. In some implementations, the user may also select what type of mask attachment to create and customize, such as a mask band or a particular design that attaches directly to the facemask without a band.

Based on the selected mask type and mask band size, the screen 302 can prompt the user to select an option to print their face or to choose a template design to customize the mask band. The user can also choose to upload an image, design, and/or picture of their face in the screen 302.

Figure 12D:
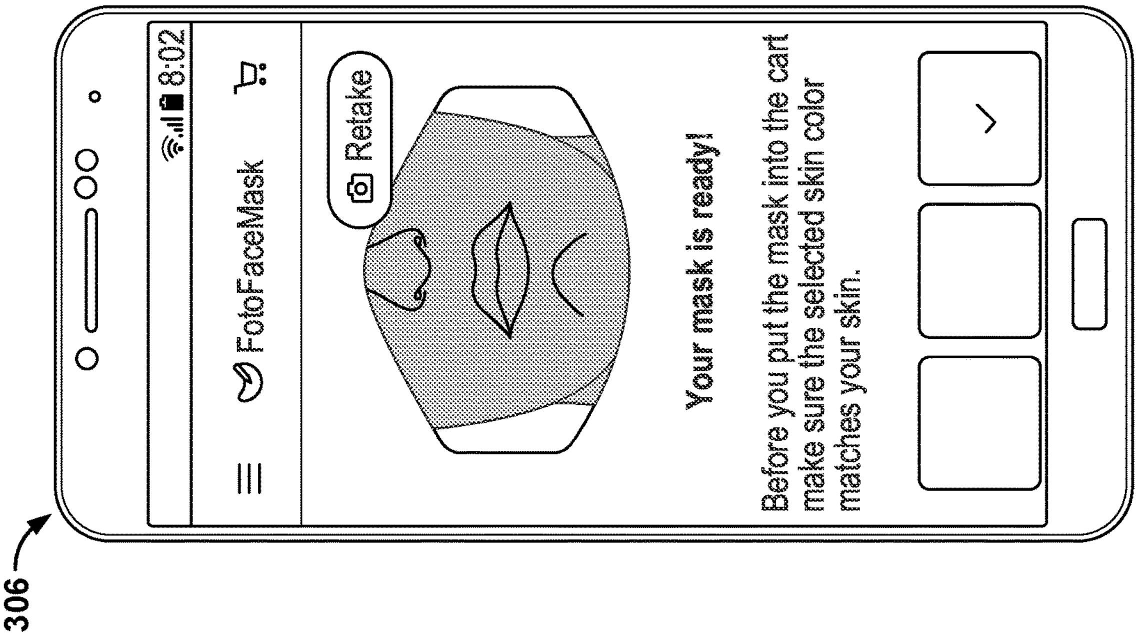
Figure 12C:
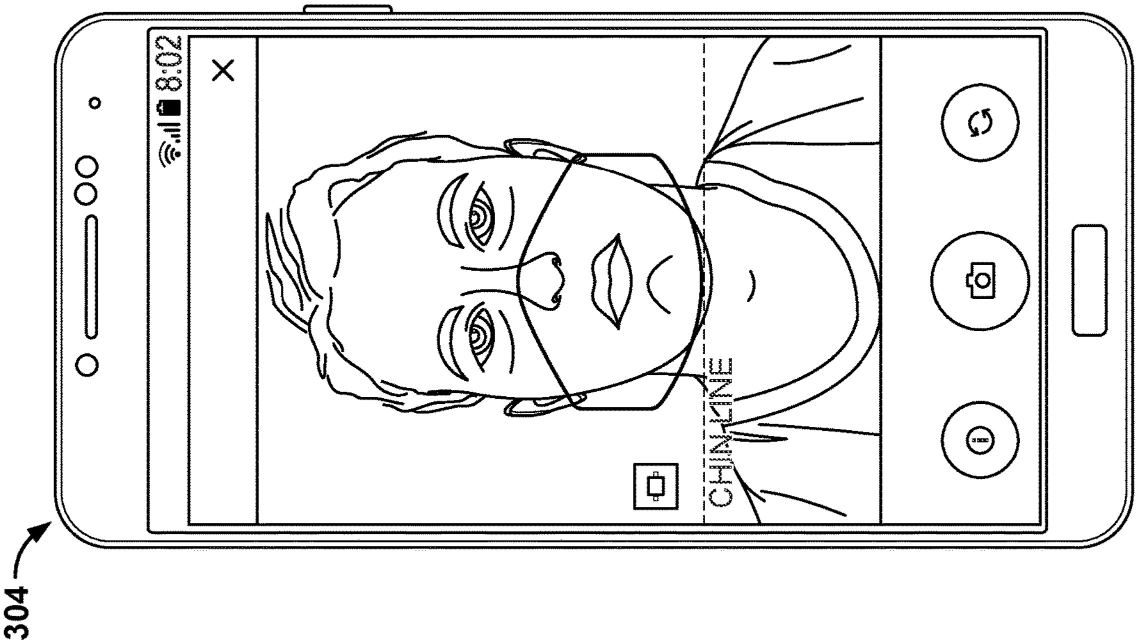

As depicted in FIG. 12C, the user chose the option to print their face. Screen 304 results, which accesses a camera of the user's device. An outline of the chosen mask type and/or the mask band fitted for the chosen mask type can be displayed on the screen 304. As a result, the user can use this outline to match up or align their face. This alignment can mimic what the mask band would look like once their face is printed thereon. The screen 304 can also include an indicator of where the user's chin would be to better assist the user in aligning their face with the chosen mask outline. As depicted in FIG. 12C, the user aligned their nose, mouth, and chin within the mask band outline. The user can then capture the picture.

In FIG. 12D, once the user captures the picture of their lower face, screen 306 can be presented. The screen 306 can display the captured image of the user's lower face as it would appear on the mask band. Moreover, the mobile application can modify portions of the captured image such that a background, hair, or other objects in the image do not appear on the mask band. As depicted in FIG. 12D, the background has been removed and a skin tone of the user was selected from the image and applied to where the background had been in the image. As a result, the user's lower face can be printed realistically across the entire mask band without expanding or altering the user's lower face. Sides of the mask band can match the user's skin tone such that the mask band blends into an actual skin tone of the user when the user wears a mask with the mask band. This can be advantageous to provide for a more realistic and personable mask band. Moreover, as depicted in FIG. 12D, the user can select and/or adjust the skin tone of the mask band. User selection of the skin tone can be applied to the entire mask band, not just portions of the mask band where background or other objects were removed.

Figure 12E:
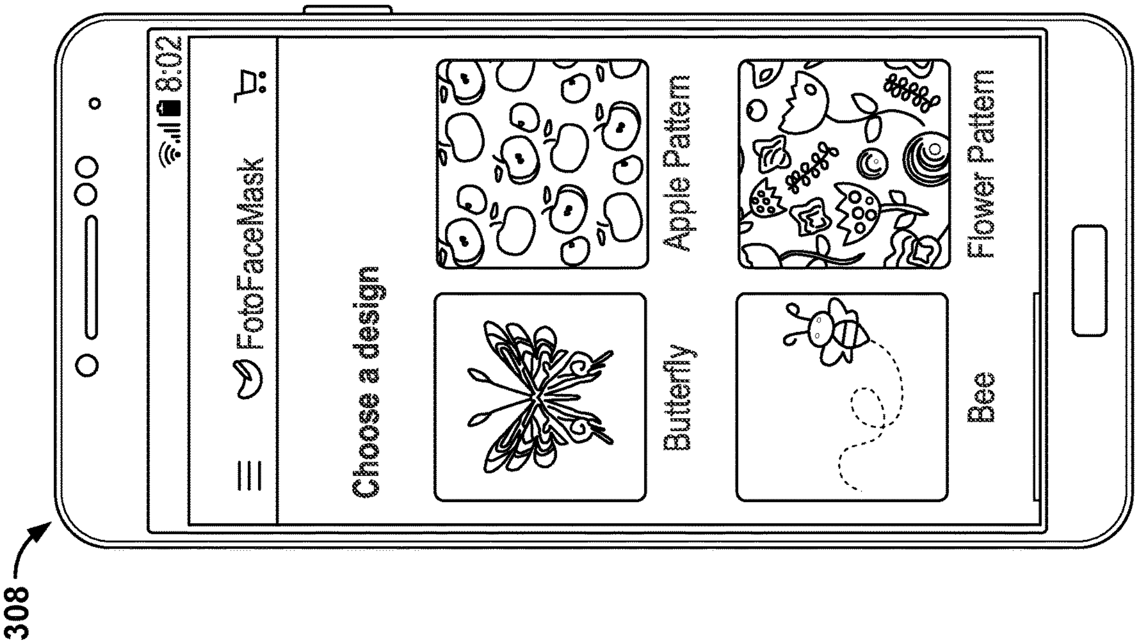

FIG. 12E depicts screen 308. The screen 308 can be displayed to the user when the user chooses to apply a design to the mask band (e.g., refer to the screen 302 in FIG. 12B). The user can be presented with premade or existing designs. Such designs can apply to an entire mask band and/or to use-selected portions of the mask band. In other implementations, the user can upload a design and/or image that the user wants on the mask band. The user can add as many or as few designs and/or images to the mask band as the user desires. As described herein, the user can also choose a design that can be attached directly to the facemask without the use of the mask band.

Figure 12F:
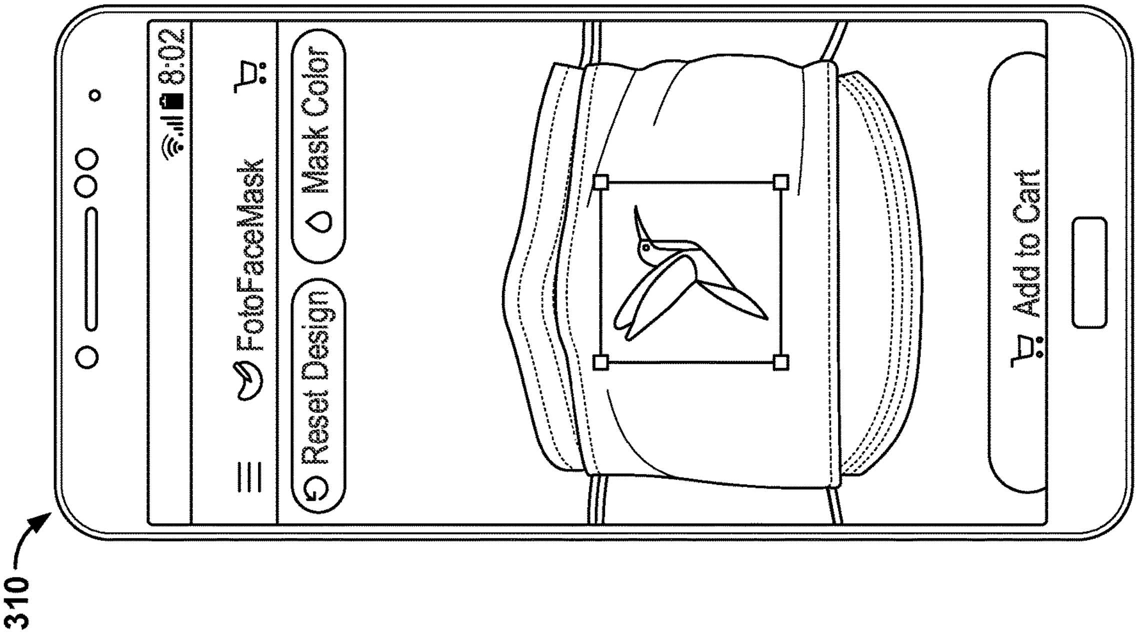

FIG. 12F depicts screen 310. The screen 310 can be presented to the user once the user selects designs and/or images to add to the mask band. The user can see how the selected designs and/or images would appear on the mask and/or the mask band. The user can also edit or modify the designs and/or images as well as placement and/or size of such designs and/or images. Any edits or changes that the user makes can be reflected in the screen 310.

Figure 12G:
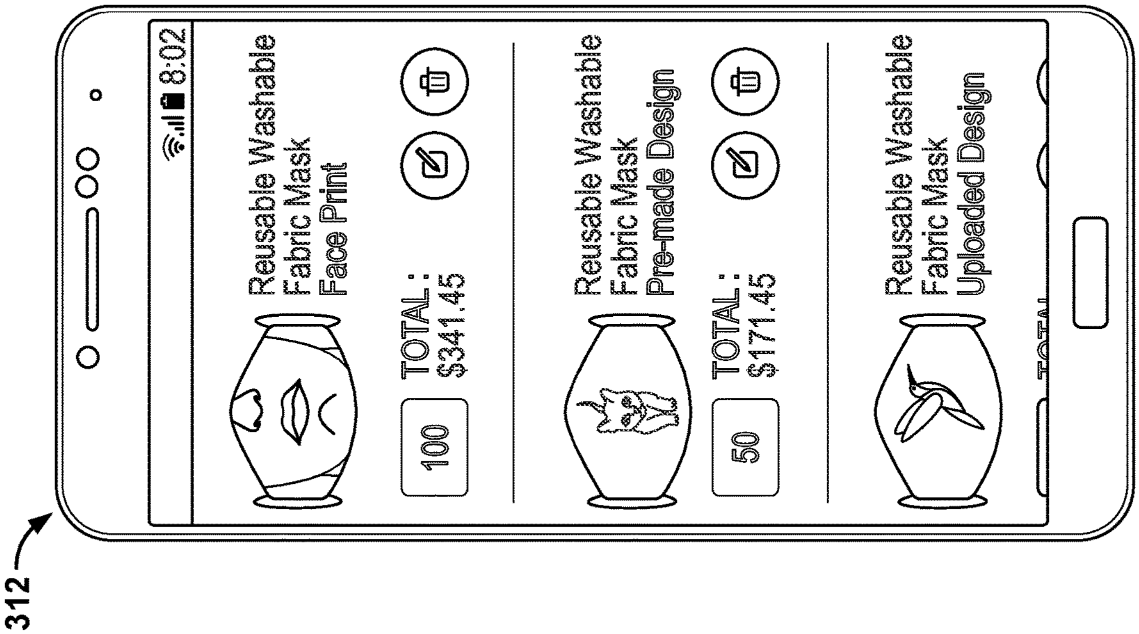

FIG. 12G depicts screen 312. The screen 312 can be presented to the user once the user is satisfied with their face, designs and/or images that the user customized on the mask band. The screen 312 can allow the user to view the customized mask band(s) in their cart. The user can adjust a quantity of each of the mask band(s) in their cart. The user can also modify any of the mask band(s) in their cart. Moreover, the screen 312 can provide for the user to checkout, purchase, and place an order for the mask band(s) in their cart.

Figure 13:
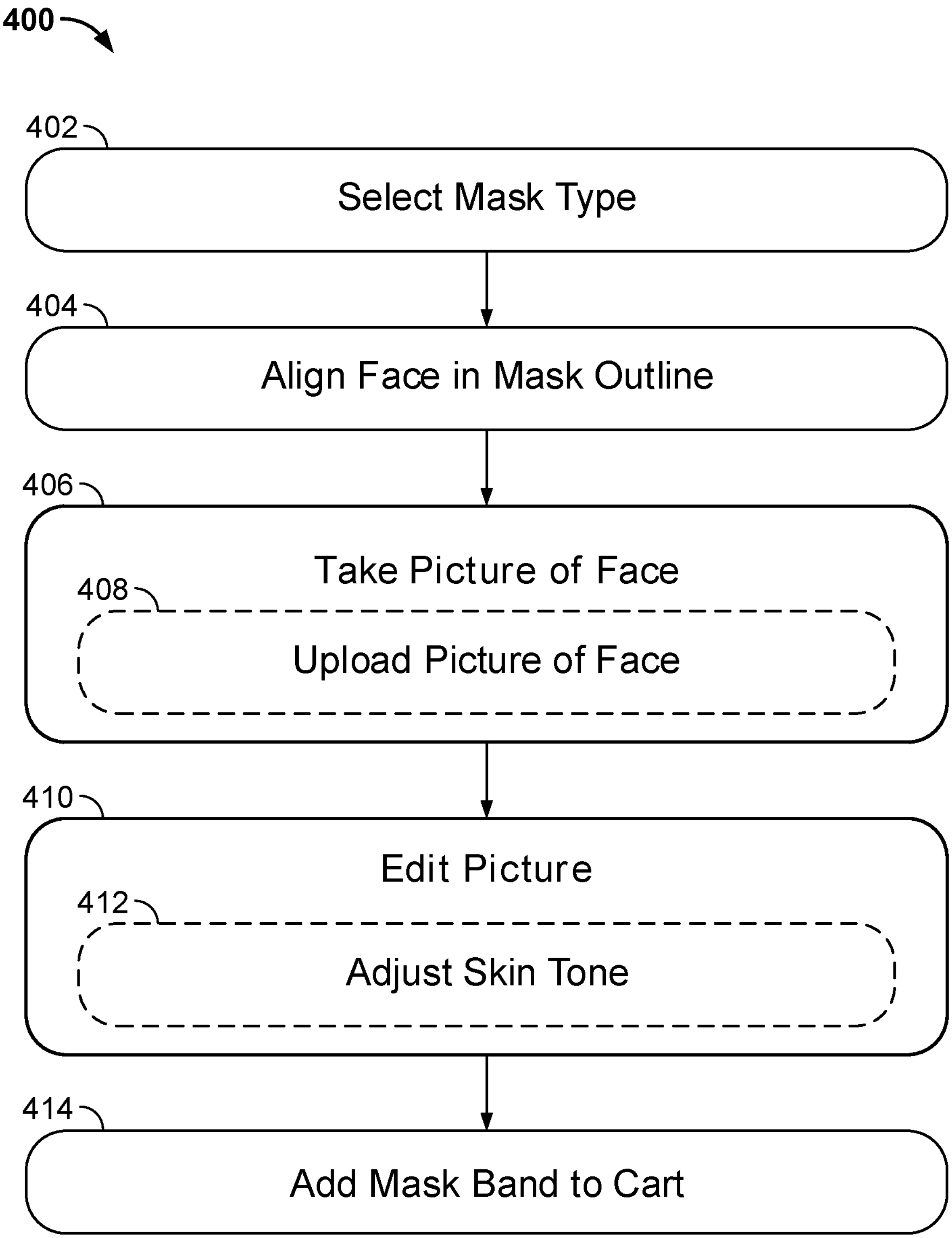
FIG. 13 is a flowchart of a process for customizing the mask band with a user's face.

FIG. 13 is a flowchart of a process 400 for customizing the mask band with a user's face. The process 400 can relate to use of the mobile application as described in reference to FIGS. 12A-G. The user can select a mask type to customize in 402. The user can align their face in a mask outline that is presented to the user in the mobile application in 404. As described above, the mask outline can be determined based on which mask type the user selected. Once the face is aligned, a picture of the face can be taken or captured in 406. In addition or alternatively, the user can upload a picture of their face or someone else's face in 408. The picture can then be edited or modified in 410. For example, skin tone can be adjusted in 412. As another example, the face can be realistically positioned on the mask band (e.g., centered). A background or objects in the picture other than the lower half of the face can also be removed from the picture. Once the user is satisfied with this customized mask band, the mask band can be added to the user's cart in 414. The user can adjust a quantity of the customized mask band and/or place an order for the customized mask band.

Figure 14:
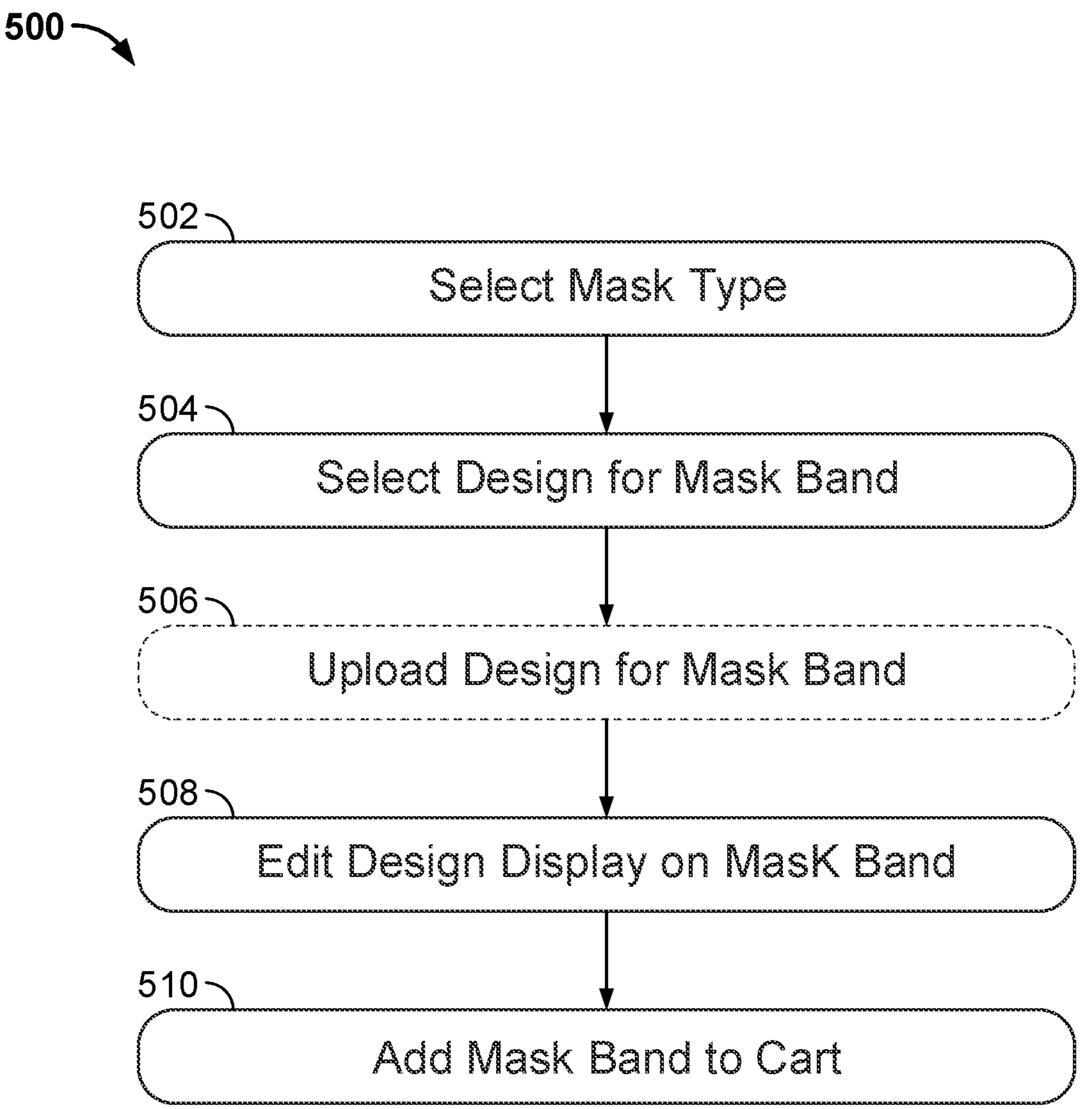
FIG. 14 is a flowchart of a process for customizing the mask band with a design.

FIG. 14 is a flowchart of a process 500 for customizing the mask band with a design. The process 500 can relate to use of the mobile application as described in reference to FIGS. 12A-G. The user can select a mask type to customize in 502. An appropriately sized mask band for the selected mask type can be identified and presented to the user such that the user can select a design for the mask band in 504. Additionally or alternatively, the user can upload a design or image for the mask band in 506. A display of the design can be edited in 508. For example, the user can change an orientation, placement, and/or size of the design on the mask band. The user can also view any changes or edits they make on the mask band. Once the user is satisfied with the customized design, the user can add the mask band to the user's cart in 510. The user can adjust a quantity of the customized mask band and/or place an order for the customized mask band.

The above described technology with regard to FFRs can also be applied to other non-FFR facemasks, such as home-made masks, cloth masks, non-surgical masks, masks that provide some filtration but not to the same extent as KN95s, N95s, and/or surgical masks.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single emodiment in part or in whole. Conversely, various features that are described in the context of a single emodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A customizable mask system comprising:
- a facemask adapted to be worn on a face of a user, the facemask comprising:
  - a plurality of layers including an external surface and an internal surface opposite the external surface, the internal surface positioned towards the face of the user when the user wears the facemask; and
  - a first fastening element welded through the plurality of layers, using ultrasonic welding, at a location that is a threshold distance between a midpoint of the external surface of the facemask and a lateral edge of the facemask; and
- a mask attachment adapted to attach to the external surface of the facemask, the mask attachment comprising:
  - an external surface made of a fabric suitable for printing customizable designs thereon;
  - an internal surface opposite the external surface of the mask attachment, the internal surface positioned towards the external surface of the facemask when the mask attachment is attached to the external surface of the facemask; and
  - a second fastening element integrated into the internal surface of the mask attachment, wherein the second fastening element mates with the first fastening element when the mask attachment is attached to the external surface of the facemask.

2. The customizable mask system of claim 1, wherein the first fastening element is inset from a perimeter of the facemask.

3. The customizable mask system of claim 1, wherein the first fastening element is ultrasonically welded onto an area of the facemask that is configured for filtering air.

4. The customizable mask system of claim 1, wherein the mask attachment is sized to cover ¼ of the external surface of the facemask.

5. The customizable mask system of claim 1, wherein the first fastening element is ultrasonically welded to the external surface of the facemask at a threshold distance between a midpoint of the external surface of the facemask and a lateral edge of the facemask.

6. The customizable mask system of claim 5, wherein the threshold distance is at least 1 inch from the midpoint of the external surface of the facemask towards the lateral edge of the facemask, the lateral edge being at least one of a right lateral edge or a left lateral edge.

7. The customizable mask system of claim 5, wherein the threshold distance is at least 2 inches from the midpoint of the external surface of the facemask towards the lateral edge of the facemask, the lateral edge being at least one of a right lateral edge or a left lateral edge.

8. The customizable mask system of claim 1, wherein the mask attachment is sized to cover 15% of the external surface of the facemask when attached thereto.

9. The customizable mask system of claim 1, wherein the first fastening element is a loop fastener and the second fastening element is a hook fastener.

10. The customizable mask system of claim 1, wherein the mask attachment is sized to cover no more than 15% of the external surface of the facemask when attached thereto.

11. The customizable mask system of claim 1, wherein the first fastening element is ultrasonically welded to the external surface of the facemask in such a manner to maintain compliance of the facemask with regulatory compliant standards and without creating punctures or holes in the facemask that reduce effectiveness of the facemask in deflecting air particles.

12. The customizable mask system of claim 1, wherein the facemask is at least one of a regulatory compliant mask that does not permit printing upon the facemask, wherein the regulatory compliant mask includes at least one of a filtering facepiece respirator (FFR), a KN95, an N95, or a surgical mask.

13. The customizable mask system of claim 1, wherein the facemask is compliant with regulatory standards that comprise at least one of: (i) fluid resistance requirements of ASTM F1862, (ii) particulate filtration efficiency requirements of ASTM F2100, (iii) airflow resistance requirements with an acceptance criterion of <6 mm H2O/cm2 for differential pressure testing of ASTM F2100, (iv) flammability performance requirements consistent with the definition of a Class 1 or Class 2 textile in 16 CFR Part 1610, or (v) a manufacturing materials requirement that includes non-cytotoxic, non-irritating, and nonsensitizing material consistent with at least one of International Standard ISO 10993-1, ISO 10993-5, or ISO 10993-10.

14. The customizable mask system of claim 1, wherein the mask attachment is a patch, the patch being removable from the external surface of the facemask and attachable to a second facemask, wherein the second facemask has a third fastening element ultrasonically welded to an external surface of the second facemask, the third fastening element configured to receive the second fastening element of the patch on at least a portion of the external surface of the second facemask.

15. A customizable facemask adapted to be worn on a face of a user, the facemask comprising:
- an external surface;
- an internal surface opposite the external surface, the internal surface positioned towards the face of the user when the user wears the facemask; and
- a first fastening element ultrasonically welded, when the facemask is manufactured, through at least the external surface of the facemask at a location that is a threshold distance between a midpoint of the external surface of the facemask and a lateral edge of the facemask,
- wherein the first fastening element is configured to mate with a second fastening element of a removable mask attachment, the removable mask attachment being adapted to cover a portion of the external surface of the facemask.

16. The customizable facemask of claim 15, wherein the customizable facemask is sized to be worn by a child and the threshold distance is at least one inch from the midpoint of the external surface of the facemask towards the lateral edge of the facemask.

17. The customizable facemask of claim 15, wherein the customizable facemask is sized to be worn by an adult and the threshold distance is at least two inches from the midpoint of the external surface of the facemask towards the lateral edge of the facemask.

18. The customizable facemask of claim 15, wherein the first fastening element is ultrasonically welded onto an area of the facemask that is configured for filtering air.

19. The customizable facemask of claim 15, wherein the customizable facemask is at least one of a regulatory compliant mask that does not permit printing upon the facemask, wherein the regulatory compliant mask includes at least one of a filtering facepiece respirator (FFR), a KN95, an N95, or a surgical mask.

20. The customizable facemask of claim 15, wherein the customizable facemask is compliant with regulatory standards that comprise at least one of: (i) fluid resistance requirements of ASTM F1862, (ii) particulate filtration efficiency requirements of ASTM F2100, (iii) airflow resistance requirements with an acceptance criterion of <6 mm H2O/cm2 for differential pressure testing of ASTM F2100, (iv) flammability performance requirements consistent with the definition of a Class 1 or Class 2 textile in 16 CFR Part 1610, or (v) a manufacturing materials requirement that includes non-cytotoxic, non-irritating, and nonsensitizing material consistent with at least one of International Standard ISO 10993-1, ISO 10993-5, or ISO 10993-10.

* * * * *